(12) United States Patent
Nielsen et al.

(10) Patent No.: US 12,342,097 B2
(45) Date of Patent: Jun. 24, 2025

(54) ENDOSCOPIC PROCEDURE DOCUMENTATION SYSTEM AND METHOD

(71) Applicant: AMBU A/S, Ballerup (DK)

(72) Inventors: Brian Nielsen, Næstved (DK); Marcelo Silvano Copat, Greenwood, IN (US)

(73) Assignee: AMBU A/S, Ballerup (DK)

( * ) Notice: Subject to any disclaimer, the term of this patent is extended or adjusted under 35 U.S.C. 154(b) by 34 days.

(21) Appl. No.: 18/380,060

(22) Filed: Oct. 13, 2023

(65) Prior Publication Data
US 2025/0126223 A1    Apr. 17, 2025

(51) Int. Cl.
| | |
|---|---|
| *H04N 5/77* | (2006.01) |
| *G06V 10/82* | (2022.01) |
| *G06V 20/40* | (2022.01) |
| *H04N 7/18* | (2006.01) |
| *H04N 23/50* | (2023.01) |
| *H04N 23/63* | (2023.01) |

(52) U.S. Cl.
CPC .............. *H04N 5/77* (2013.01); *G06V 10/82* (2022.01); *G06V 20/46* (2022.01); *H04N 7/183* (2013.01); *H04N 23/555* (2023.01); *H04N 23/631* (2023.01)

(58) Field of Classification Search
CPC ........ H04N 5/77; H04N 7/183; H04N 23/555; H04N 23/631; G06V 10/82; G06V 20/46
See application file for complete search history.

(56) References Cited

U.S. PATENT DOCUMENTS

| | | |
|---|---|---|
| 9,785,753 B2 | 10/2017 | Casella dos Santos |
| 10,169,535 B2 | 1/2019 | Mentis |
| 10,342,410 B2 | 7/2019 | Schwartz et al. |
| 10,671,934 B1 | 6/2020 | Ninh et al. |
| 10,729,502 B1 | 8/2020 | Wolf et al. |

(Continued)

FOREIGN PATENT DOCUMENTS

| | | |
|---|---|---|
| JP | H06225855 A | 8/1994 |
| JP | 2017012676 A | 1/2017 |

(Continued)

OTHER PUBLICATIONS

Sony HVO-500MD Use Instructions, copyright 2014, 95 pages.
(Continued)

*Primary Examiner* — Girumsew Wendmagegn
(74) *Attorney, Agent, or Firm* — Faegre Drinker Biddle & Reath LLP

(57) ABSTRACT

A video processor configured to record images captured by an image sensor of a visualization device and including a processing circuit including volatile memory, non-volatile memory, and a controller; a housing; and a communication interface, wherein the controller is configured to: present with the display a frame selector and frames stored in the image buffer, update the image buffer with the frames, repeatedly receive a first user input responsive to movement the frame selector, cause the display to present at least some of the frames in response to receipt of the first user inputs, receive a second user input responsive to release of the frame selector, and store a retrospective video file in non-volatile memory, the retrospective video file beginning and ending with frames corresponding to the first and second user inputs.

27 Claims, 18 Drawing Sheets

(56) References Cited

U.S. PATENT DOCUMENTS

| | | |
|---|---|---|
| 10,943,682 B2 | 3/2021 | Wolf et al. |
| 11,065,079 B2 | 7/2021 | Wolf et al. |
| 2008/0144906 A1 | 6/2008 | Allred et al. |
| 2018/0092509 A1* | 4/2018 | Yamaki ................ A61B 1/0661 |
| 2023/0172428 A1 | 6/2023 | Jørgensen et al. |
| 2023/0233098 A1 | 7/2023 | Jørgensen et al. |
| 2024/0021103 A1 | 1/2024 | Jørgensen et al. |

FOREIGN PATENT DOCUMENTS

| | | |
|---|---|---|
| WO | 2019164775 A1 | 8/2019 |
| WO | 2020251596 A1 | 12/2020 |
| WO | 2021010985 A1 | 1/2021 |

OTHER PUBLICATIONS

MediCapture Inc. MVR Pro HD webpage, printed Nov. 17, 2020, 5 pages.
Olympus Pre-Freeze webpage, Jan. 31, 2024, 1 page.
Provation Clinical Productivity Solutions webpage, copyright 2024, 6 pages.
Search report in European Application No. 21168178.8, dated Sep. 21, 2022, 9 pages.

* cited by examiner

ENDOSCOPIC PROCEDURE DOCUMENTATION SYSTEM AND METHOD

CROSS-REFERENCE TO RELATED APPLICATIONS

None.

TECHNICAL FIELD

The present disclosure relates to an endoscopic system and a video processor for the endoscopic system. More specifically, the disclosure relates to a method of recording images generated by the endoscopic system.

BACKGROUND

Endoscopes are widely used to visually examine patients' body cavities and to obtain tissue samples. For instance, bronchoscopies or colonoscopies may be carried out to examine whether a patient has a lung or colon disease, respectively, a tumor, or the like. An endoscope typically comprises a handle or interface, an insertion cord extending from the handle, an image sensor arranged at the distal end of the insertion cord, and a working channel to introduce medical instruments through the insertion cord. The image sensor captures images, which can be still images or video, and the images are presented in a display so that the operator of the endoscope can navigate the endoscope to desired locations.

Typically, when an endoscopic examination of a human cavity is carried out, i.e. an endoscopic procedure, the medical personnel will need to search through various parts of the human cavity. This often includes moving the endoscope into a part of the human cavity and back to an earlier position to again move the endoscope into another part of the human cavity. For instance, human airways have a branched structure and when one branch of a branching has been examined, the endoscope will typically be retracted to a branching and subsequently moved from that branching into another branch of the branching. This may, however, be a challenging task as parts of the bronchial tree are very narrow and provide little space for the endoscope. Unintentionally colliding the endoscope with the bronchial wall may be very unpleasant for the patient and should be avoided. In other examinations, the endoscope may be re-inserted into a part of the human cavity, in which it has already been, to make further examination of the part of the human cavity.

An important part of the work for a medical professional is to document the result of an endoscopic procedure. The medical professional may need to document the discovery of a pathological condition or to verify that locations in the body that should be investigated were actually investigated. This is typically done by including still images or videos in a report. In theory, a video of an entire endoscopic examination could be saved. However, such an approach would result in very large datasets and reports. Furthermore, it may be difficult or prohibitively expensive, afterward, to review the video of the complete examination, which could exceed two hours, to find the important parts of the video. Additionally, if a location that should be investigated is inadvertently missed, the procedure may need to be repeated. As the resolution of image sensors, and the resulting file sizes, increase, these problems are exacerbated.

SUMMARY

The present disclosure provides an endoscopic system, a video processor for the endoscopic system, and a method of recording images during an endoscopic procedure. The method may be implemented, at least in part, by the video processor. The video processor and the method address the problems identified in the prior art. More specifically, the video processor and method enable the retrospective selection of images during an endoscopic procedure, which in turn enables storage of images of reduced file size and increased clinical relevance for the purpose of documentation of the endoscopic procedure. In this context, clinical relevance refers to the recording of clinically relevant events. The retrospective selection is performed in part by medical personnel, also referred to as physician, operator, they/them, and when referencing inputs or hardware interactions, user input or user interface.

Furthermore, endoscopic systems may be provided with a record button, either on the endoscope handle or on a display, which when activated initiates the recording pf images. Such a button acts prospectively, in the sense that it records images generated after activation of the record button. Thus, the video of the live images is referred to as a prospective video because the live frames received from the visualization device are continuously saved in the video as time goes on. Therefore, if the medical professional does not timely push the record button, a clinically important moment may be missed. This may be especially problematic if the clinically important moment includes a special movement of an organ, because the movement may not happen again for a long period of time. Additionally, if the medical professional just forgot to document that a particular part of the body was examined, the medical professional might need to re-examine the part of the body, resulting in a waste of time and unnecessary discomfort for the patient. In embodiments of the video processor and method provided herein these problems are avoided by providing a retrospective record function.

By "live view" it is meant that images or video are received by the video processor from the visualization device and presented in substantially real-time, with minimal (in the order of milliseconds or less than 6 frames at 30 fps, preferably 3 or less frames) latency so that the physician observing the live video can rely on the view being representative of the current position of the visualization device.

According to a first aspect, a video processor is operable to record a subset of images responsive to one or more user inputs. By enabling the operator to start recording video from a point back in time, the risk that the operator misses a relevant clinical event may be reduced. Furthermore, the clinically relevant moment may be stored without storing video covering a long period of time prior to when the clinically relevant moment or event occurred. This may reduce the size of the video file and, further, make it easier afterward to find clinically important moments.

In one embodiment according to the first aspect, a video processor is configured to record images captured by an image sensor of a visualization device and comprises: a processing circuit including volatile memory, non-volatile memory, and a controller; a housing; and a communication interface, wherein the controller is configured to: present with the display a frame selector and frames stored in the image buffer, update the image buffer with the frames, repeatedly receive a first user input responsive to movement the frame selector, cause the display to present at least some of the frames in response to receipt of the first user inputs, receive a second user input responsive to release of the frame selector, and store a retrospective video file in non-volatile memory, the retrospective video file beginning and ending with frames corresponding to the first and second user inputs.

The video processor may comprise an integrated touch-display, a display that is not touch sensitive, and/or a display interface operable to communicatively connect the video processor to a display that is physically separate from the video processor and which may be a touch-sensitive display. The video processor is configured to buffer the video, which comprises images including a first image, a last image, and intermediate images between the first image and the last image. The video processor is further configured to receive user inputs to select a subset of images comprising less than a total number of the images of the video transmitted by the visualization device.

According to a second aspect, the present disclosure relates to an endoscopic system comprising a video processor as disclosed in relation to the first aspect and a visualization devise, such as an endoscope, comprising an image sensor.

According to a third aspect, the present disclosure relates to a method of recording images captured by an image sensor of an endoscope, the method comprising continuously receiving images captured by the image sensor of the endoscope; continuously updating a temporary image buffer stored in memory with the received images, the temporary image buffer storing a stream of images received within a first period back in time; in response to a received user input, storing permanently a stream of images recorded by the image sensor in the memory, wherein the permanently stored video includes a subset of the stream of images stored in the temporary image buffer, and wherein the subset is selected dependent on the user input so that a operator may select the point back in time where the operator wants the permanently stored stream of images to start.

According to a fourth aspect, the present disclosure relates to a computer program product comprising program code means adapted to cause a controller to perform the steps of the method as disclosed in relation to the third aspect, when said program code means are executed by the controller.

In some embodiments said computer program product comprises a non-transitory computer-readable medium having stored thereon the program code means.

Embodiments described in connection with one of the aspects described herein may equally be applied to the other aspects.

BRIEF DESCRIPTION OF THE DRAWINGS

The above and/or additional embodiments described below, including variations and examples thereof and respective features and advantages will be further elucidated by the following illustrative and non-limiting detailed description of embodiments of the present disclosure, with reference to the appended drawings, wherein.

DETAILED DESCRIPTION

In the following description, reference is made to the accompanying figures, which show by way of illustration how the embodiments of the present disclosure may be practiced.

Figure 1:
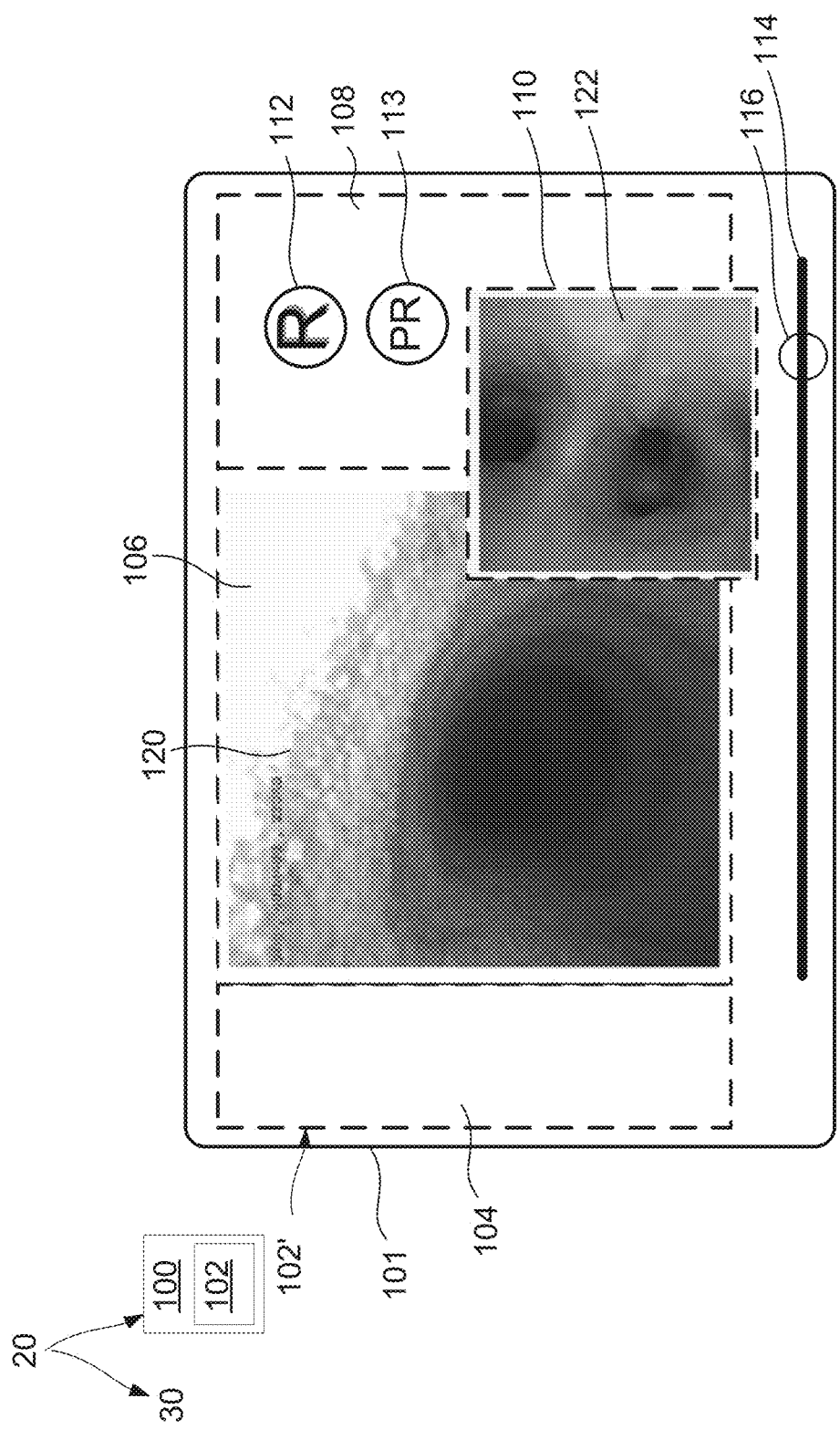
FIG. 1 illustrates a display showing a view of an embodiment of a graphical user interface in accordance with the present disclosure.
Figure 12:
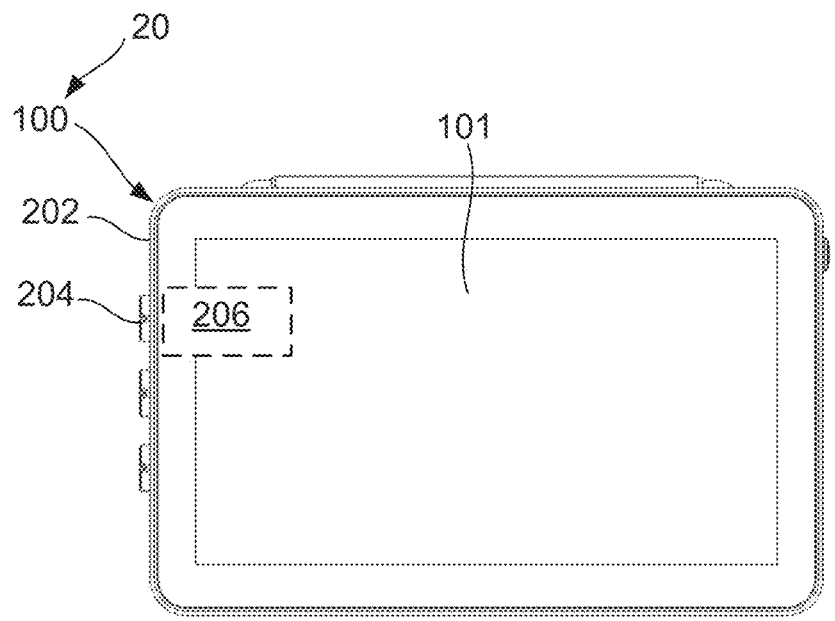
FIG. 12 is a front view of an embodiment of a video processor, incorporating a display.
Figure 13:
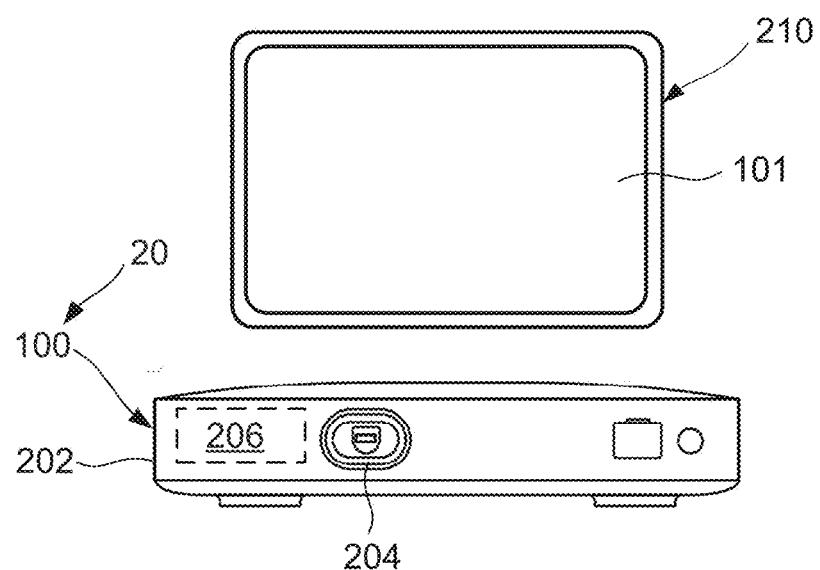
FIG. 13 is a front view of another embodiment of the video processor, devoid of a display.

FIG. 1 is a view of a display showing a graphical user interface in accordance with an embodiment of the present disclosure. In the present embodiment, an endoscopic system 20 comprises a visualization device, illustratively an endoscope 30, and a video processor 100 including graphical user interface logic 102 operable to present a graphical user interface (GUI) 102' on a display 101. Visualization devices are devices that include an insertion part with an image sensor at a distal end and which can be communicatively connected with the video processor 100. Example visualization devices include endoscopes, endotracheal tubes, laryngoscopes, and the like. Endoscopes include reusable and disposable, i.e. single-use, endoscopes, steerable and rigid endoscopes, and specialized instruments such as bronchoscopes, arthroscopes, colonoscopes, laparoscopes, gastroscopes, duodenoscopes, ureteroscopes and the like. Embodiments of the video processor 100 are shown in FIGS. 12 and 13.

In one embodiment, the GUI 102' includes a plurality of window panels, for example a left panel 104, a central panel 106, a right panel 108, and a pip panel 110. The left panel 104 may provide a menu of options for the endoscopic procedure. The central panel 106 may provide a live view 120 of the endoscopic procedure. The right panel 108 may provide options for recording images and may include, for example, a retrospective recording button 112 operable, when actuated, to generate a retrospective recording input 113a and a prospective recording button 113 operable, when actuated, to generate a prospective recording input 113a. The pip panel 110 is a pop-up panel in which video frames read from a memory buffer (described below as memory 252v of memory 252 with reference to FIGS. 2B and 14) can be shown. The video frames added to the memory buffer are frames received in substantially real-time from the visualization device and are described below as frames of a prospective video, indicating that the frames are added to the video as they are captured. Whereas the live video frames are shown as they occur, the frames read from the memory buffer and presented in the pip panel 110 are presented in response to a user input and therefore retrospectively, back in time. The video frames shown in the pip panel 110 may comprise less than the stored frames. For example, to save processing capacity some frames may be omitted, as described below. If the prospective video frames are stored at a rate of 60 frames per second, for example, at least at some times the video frames shown retrospectively may be shown at 30 frames per second or even less. The frame rate may be varied depending on the velocity of a movement of a frame selector, described below, so that with higher velocity the frame rate is lower and as the velocity decreases the frame rate increases. At the lower frame rate every other frame, or two or three or more frames, are skipped and are not presented. Generally, however, the best quality video is used to present the live and retrospective images on the display. Reduced quality video, for example downscaled and reduced frame rate, can be used in the landmark estimation process described below. Compression will generally be used to save large videos, typically comprising an entire endoscopic procedure. Retrospective video will, generally, be uncompressed or lossless compressed, although some amount of lossy compression may also be used, particularly as the raw resolution increases to, for example, 800×800 and 1500×1500 pixels.

Below the window panels a timing bar 114 (also known as a scrub bar) may be provided along with a frame selector 116 operable, when actuated, to generate a first user input 116a and/or a second user input 119a. The pip panel 110 shows the frame corresponding to the position of the frame selector 116 on the timing bar 114. The sizes of the window panels may be adjustable. The term "panel" is used for illustrative purposes. What is relevant is that the GUI presents the menus, live view, recording buttons, timing bar and frame selector which, in the present embodiment, are used to perform retrospective recording. Operation of the GUI 102' will now be described with reference to FIG. 2.

Figure 2A:
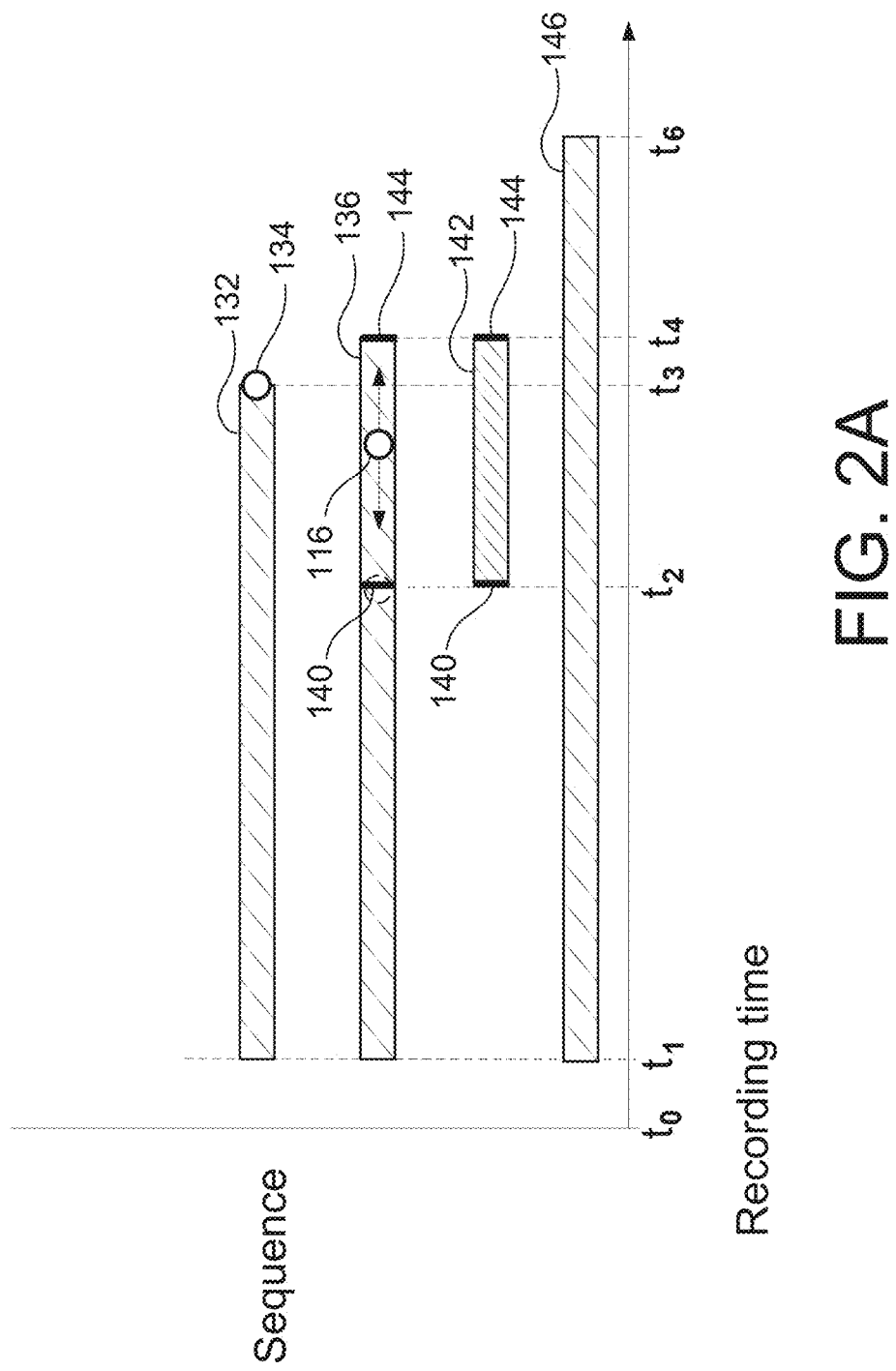
FIG. 2A is a timing chart illustrative of a sequence of events in an embodiment of a method of recording images in accordance with the present disclosure.

FIG. 2A is a timing chart illustrative of a sequence of events in accordance with the embodiment of the GUI 102' of FIG. 1. The sequence of events will be described in further detail with reference to the flowchart depicted in FIG. 3. The sequence of events occurs vertically and downwardly, while the timing of various events is shown horizontally. Referring now to FIG. 2, at $t_0$ the components of the endoscopic system 20 are initially assembled and turned-on. For example, the endoscope 30 may be communicatively connected to the video processor 100 and the video processor 100 may perform a power-up sequence before the GUI 102' is presented.

In the present embodiment, at time $t_1$ the video processor 100 may begin processing images received from the visualization device and reflected as a prospective video 132. The prospective video 132 may be stored in random-access memory as it is received from the endoscope 30. A portion of the random-access memory may be allocated as a video or image buffer. In one variation of the present embodiment, the time $t_1$ occurs when the video processor 100 senses that it is communicatively connected to the endoscope 30. Such sensing may be due to sensing current flow from a connection port of the video processor 100 to the endoscope, due sensing of data flowing from the endoscope 30 to the connection port, or due to sensing of any other signal indicative of a physical connection or a wireless connection between the endoscope 30 and the video processor 100. The present variation ensures that video is captured regardless whether a prospective recording user input is provided to initiate recording.

Establishing connection to a visualisation device may include obtaining device identifier information from a device identifier (e.g. EPROM, QR-code, NFC, RFID or similar) of the visualisation device. In response to establishing connection to the first visualisation device the video processor may open a first procedure session corresponding to a first device identifier information obtained from a first device identifier of the first visualisation device. In response to establishing connection to a second visualisation device the video processor may open a second procedure session corresponding to a second device identifier information obtained from a second device identifier of the first visualisation device. Hence, a procedure session may be created for each connected visualisation device. The device identifier information may be used to select, from memory, routes and visual organ maps, as described with reference to FIG. 7. The device identifier information may also be stored in the metadata of image and video files, along with a time-stamp. The time-stamp along with other identification information may be used to relate multiple video files/clip files obtained from the same endoscopic procedure. A procedure session may be implemented by creating a folder in the file system of the video processor, wherein image/video/clip files obtained from a visualisation device are stored in the folder corresponding to the visualisation device. Hence, association of a file to a procedure session may be implemented by storing the file in the folder of the procedure session. Opening a procedure session may further comprise creating a log, registering the time and date for initiating the procedure, registering information about the visualisation device, registering software version and/or other information. A procedure session refers to an endoscopic procedure on a patient.

In a first variation, the time $t_1$ corresponds with activation of the prospective recording button 113. Upon said activation the prospective recording input 113a indicates to the video processor 100 that it may begin processing images received from the visualization device and reflected as a prospective video 132. The present variation may be useful in the event that the system is capable of processing images but the operator is not yet ready to begin the procedure. Then, activation of the prospective recording button 113 ensures that video is captured at the beginning of the procedure rather than when the system is capable of processing images.

In a second variation, the video processing begins when the system is capable of processing images. Then, if the operator activates the prospective recording button 113, the already processed images, corresponding to images captured before the procedure begun, are discarded and the prospective video begins responsive to receipt by the video processor of the prospective recording input 113a.

At the time $t_3$ the video processor 100 receives the retrospective recording input 112a. The frame selector 116 is located at a location corresponding to the frame presented when the retrospective recording input 112a is received. At that time all the prospective images were already processed. After that time more prospective images are processed.

In a variation of the present embodiment, the retrospective recording input 112a is generated by activation or movement of the frame selector 116. In the present variation, the timing bar 114 and the frame selector 116 are presented in an enabled mode and the retrospective recording button 112 may be omitted. Thus, the operator can touch/move the frame selector 116 to indicate their intent to perform retrospective recording. Movement of the frame selector 116 causes the controller 250 to present different frames in the pip panel corresponding to the movement. The movement causes repeated generation of signals which the controller uses to control presentation of the frames. The timing bar 114 and the frame selector 116 may be presented in a disabled mode initially, prior to time $t_1$, and then enabled at time $t_1$, which may be shown by illuminating or changing the color of the timing bar 114 and/or the frame selector 116 to indicate to the operator that prospective recording of the live view has started and that, therefore, retrospective recording may be performed.

Between the time $t_3$ and the time $t_2$ the operator moves the frame selector 116 to a position where the operator wants to begin the retrospective video. This is shown as a double-headed arrow across the circle 116 on a prospective video 136. The prospective video 136 is like the prospective video 132 except for the addition of frames between times $t_3$ and $t_4$, which are captured while the operator views the frames in the pip panel 110. In other words, the video processor 100 continues prospective recording while the operator chooses what portions of the prospective video to keep. The operator determines the start of the retrospective video by looking at the image 122 in the pip pane 110. While the operator is moving the frame selector 116 and observing the images, the video processor 100 continues to receive images/frames from the visualization device and adding them to the prospective video. This is shown by the increase length, between times $t_3$ and $t_4$, of the prospective video 136.

At the time $t_2$ the video processor 100 receives the first user input 116a. The first user input 116a may be generated when the operator releases the frame selector 116, at a frame 140 of the prospective video 136. In the present embodiment, when the operator selects the frame 140, which is the first frame of the retrospective video, the video processor 100 also determines that the last frame added to the prospective video prior to the selection of the first frame, at the time $t_2$, denoted as a frame 144, is the last frame of the retrospective video 142. Thus, this embodiment allows an operator to move the frame selector 116 to the start of the retrospective video and, upon release of the frame selector 116, save the retrospective video 142.

In a variation of the present embodiment the first user input 116a is generated when the operator activates the retrospective recording button 112 again, essentially toggling the button to begin and end the process of saving the retrospective video 142. The frame selector 116 is used to choose the frame 140 but not to save the retrospective video. A different button can also be used to generate the first user input 116a.

In the present embodiment, the video processor may continue processing prospective images (from the visualization device), which are added to the prospective video, denoted as 146, while concurrently saving the retrospective video 142. The operator can then repeat the selection process from a point later in time using the same prospective video, which as shown is longer in duration. In this manner the operator can capture a retrospective video, or clip, of a clinically relevant landmark or event promptly after it happens and then continue the endoscopic procedure to capture additional clinically relevant landmarks or events. This process has the advantage that the operator may not need to, after completion of the procedure or a portion of it, go back in time multiple times, which wastes time and resources. It is also possible to program the processing device to delete frames of the prospective video starting at time $t_0$ up to time $t_4$, for example, in particular if the prospective video is maintained in RAM, which is typically limited in capacity due to cost. Such deletion may be made responsive to completion of saving of the retrospective video 142.

In another variation of the present embodiment, when the video processor 100 receives the retrospective recording input 112a it stops adding images/frames to the prospective video. Thus, the frame 144 is the last frame added to the prospective video prior to the time $t_3$. This may be helpful to prevent storing additional images/frames while the operator may be focused on documenting the procedure instead of continuing the navigate the visualization device. In the present variation the operator may activate the prospective recording button 113 again to continue processing prospective images (from the visualization device), which are added to the prospective video. The operator can then repeat the selection process from a point later in time using the same prospective video, which will therefore be longer in duration.

The foregoing sequence may be described from an apparatus perspective, as follows. A video processor configured to record images captured by an image sensor of a visualization device, the video processor comprising: a processing circuit including volatile memory, non-volatile memory, and a controller, at least a portion of the volatile memory designated as an image buffer; a housing at least partly enclosing the processing circuit; a connection port configured to receive a visualization device connector and to receive through the visualization device connector image signals corresponding to the images captured by the image sensor; and a touch-display at least partly enclosed by the housing and communicatively connected with the controller, the touch-display configured to present a graphical user interface (GUI), live views of the images, a frame selector of the GUI, and frames stored in the image buffer and comprised of image data corresponding to the image signals, wherein the controller is configured to: (a) cause the touch-display to present the GUI, (b) update the image buffer with the frames as the image signals are received at the connection port, (c) repeatedly receive a first user input responsive to an operator moving the frame selector by touching the touch-display, (d) cause the touch-display to present at least some of the frames in response to receipt of the first user inputs, (e) receive a second user input responsive to the operator ceasing touching of the touch-display at the frame selector, (f) identify as a first retrospective frame a frame, of the at least some of the frames, presented at the time the controller received the second user input, (g) identify a second retrospective frame, and (h) store a retrospective video file in the non-volatile memory, the retrospective video file beginning and ending with the first retrospective frame and the second retrospective frame and including frames, of the frames, between the first retrospective frame and the second retrospective frame.

The foregoing sequence can be described in an embodiment of a method of creating a retrospective video/clip. In the present embodiment the video processor, such as the video processor 100, records in its memory live images received from a visualization device to which it is communicatively connected. Processing of live images comprises receiving the images, potentially from a visualization device interface that converts serialized data to parallel image data and placing the image data in memory. Before or after placing the image data in memory the video processor may perform optimization functions such as correcting color or tone, pixel intensity, and the like. At some point the video processor receives a first user input corresponding to frame captured at a point in time prior to the present time. The present time frame becomes the last frame of the retrospective video. The video processor associates the first user input with a first selected frame of the prospective video. The first selected frame will become the first frame of the retrospective video/clip. The association is based on the position of the frame selector on the timing bar and the correspondence of the timing bar to the prospective video. Thus, for each position in the timing bar there may be a corresponding frame of the prospective video (unless the frame rate is reduced or variable) and placing a frame selector on a position in the timing bar therefore associates that position with the corresponding frame of the prospective video. As discussed below, the spacing between frames on the timing bar can be changed with a focus feature. Upon receipt of the first user input, the video processor saves a retrospective video/clip including frames from the prospective video comprising the first, selected, frame and all the frames following the selected frame until the last frame. The video processor may continue to add frames, and the operator may repeat the process to save another clip containing frames captured after the present time.

In another variation, the operator can let the prospective video run after selecting the first frame, and the operator can then generate a second user input 119a to select the present time frame as the last frame and save the retrospective video. The second user input 119a may be generated by actuating the retrospective recording button 112 again. Therefore, the retrospective recording button 112 can be toggled to begin the process of recording the retrospective video and also to select the end of the retrospective video. The retrospective recording button 112 may be illuminated or its color changed to indicate that the retrospective recording process is ongoing, and upon toggling the retrospective recording button 112 the color is changed back or illumination is ended or both. For example, the retrospective recording button 112 may be green before the retrospective recording process starts, red when activated the first time, and back to green when the process ends.

The foregoing sequence may be described from an apparatus perspective, as follows. A video processor configured to record images captured by an image sensor of a visualization device, the video processor comprising: a processing circuit including volatile memory, non-volatile memory, and a controller, at least a portion of the volatile memory designated as an image buffer; a housing at least partly enclosing the processing circuit; a connection port configured to receive a visualization device connector and to receive through the visualization device connector image signals corresponding to the images captured by the image sensor; and a touch-display at least partly enclosed by the housing and communicatively connected with the controller, the touch-display configured to present a graphical user interface (GUI), live views of the images, a frame selector of the GUI, and frames stored in the image buffer and comprised of image data corresponding to the image signals, wherein the controller is configured to: (a) cause the touch-display to present the GUI, (b) update the image buffer with the frames as the image signals are received at the connection port, (c) repeatedly receive a first user input responsive to an operator moving the frame selector by touching the touch-display, (d) cause the touch-display to present at least some of the frames in response to receipt of the first user inputs, (e) receive a second user input responsive to the operator ceasing touching of the touch-display at the frame selector, (f) identify as a first retrospective frame a frame, of the at least some of the frames, presented at the time the controller received the second user input, (g) identify a second retrospective frame, and (h) store a retrospective video file in the non-volatile memory, the retrospective video file beginning and ending with the first retrospective frame and the second retrospective frame and including frames, of the frames, between the first retrospective frame and the second retrospective frame; wherein the GUI comprises a second frame selector, and wherein the controller is configured to: (i) repeatedly receive a third user input responsive to the operator moving the second frame selector by touching the touch-display, (j) cause the touch-display to present at least some of the frames in response to receipt of the third user inputs, (k) receive a fourth user input responsive to the operator ceasing touching of the touch-display at the second frame selector, and (l) identify as the second retrospective frame a frame, of the at least some of the frames, presented at the time the controller received the fourth user input. The first retrospective frame may be the first or the last frame of the retrospective video file and the second retrospective frame may be, correspondingly, the last or the first frame of the retrospective video file. The last frame of the retrospective video file may have been stored in the image buffer after the controller received the first user input. The controller may be configured to store the retrospective video file in the non-volatile memory uncompressed or compressed in a lossless format and to store a lossy compressed prospective video file in the non-volatile memory, the lossy compressed prospective video file comprising the frames in the updated image buffer, as described below.

Figure 2B:
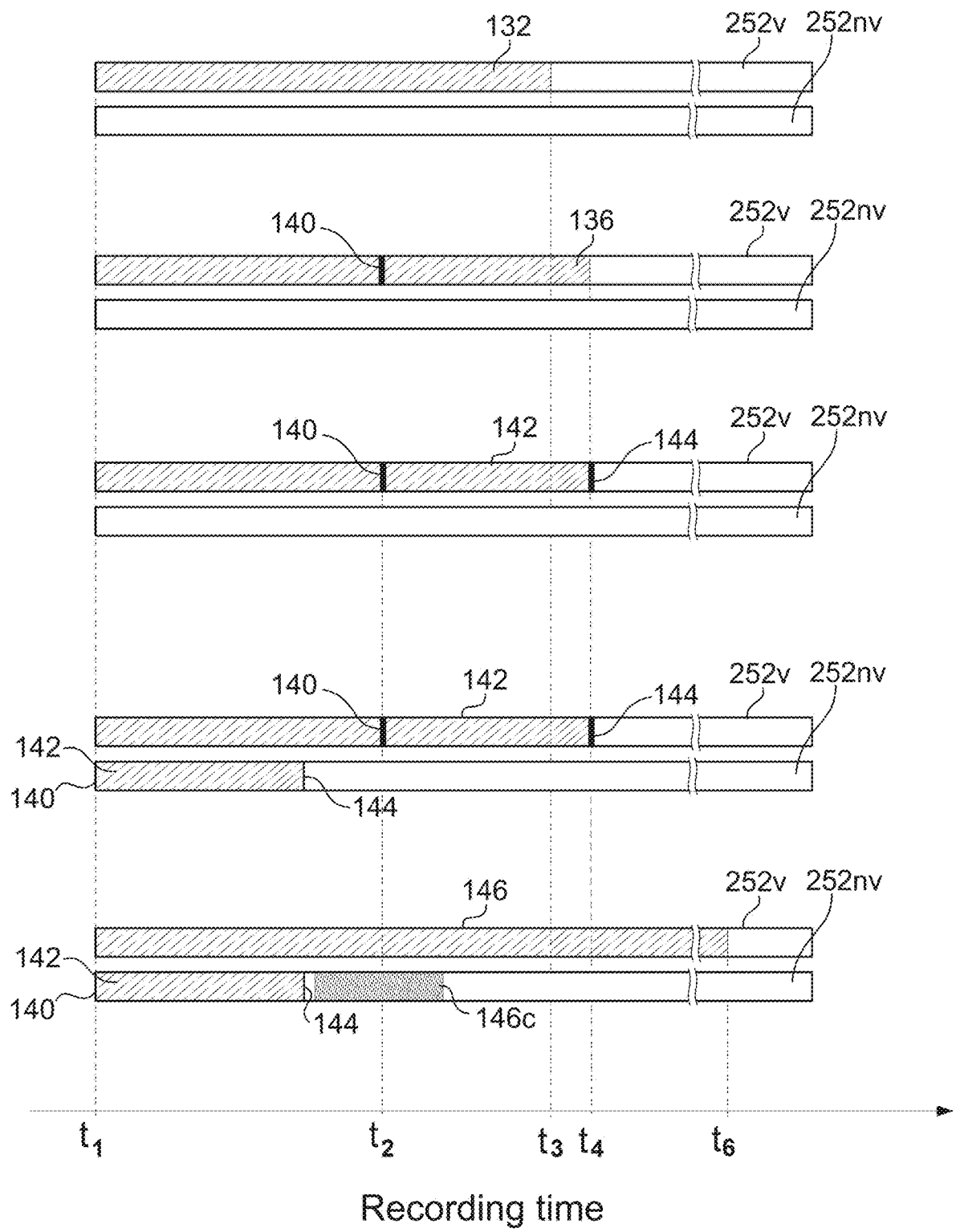
FIG. 2B is a timing chart like that of FIG. 2A but showing movement of video into memory.

FIG. 2B shows how the retrospective video 142 and the prospective video 146 stored in a memory 252, described with reference to FIG. 14 and comprising volatile memory 252v and non-volatile memory 252nv. Volatile memory 252v is, generally, faster, smaller, and more expensive than non-volatile memory 252nv. Additionally, video stored in the non-volatile memory 252nv is preserved after the battery of the video processor 100 is exhausted or the video processor 100 is unplugged from a power source. The prospective video 132 is stored in the volatile memory 252v, which may be referred to as an image buffer or memory buffer. As the operator follows the process described with reference to FIG. 2A, more frames are added to form the prospective video 136 and select the first and last frames of the retrospective video or clip 142. Once the first and last frames 142, 144 are selected (depending on which variation of the processes is implemented this happens in different ways), the retrospective clip 142 is copied to the non-volatile memory 252nv. The frames of the retrospective clip 142 may remain in the volatile memory 252v. In one variation, at a later time $t_6$ the prospective video, which by now is longer and thus denoted as prospective video 146, is erased when the procedure is completed, after the operator stored the desired retrospective clips. Erasure saves non-volatile memory and the processing capacity to permanently store the content of the memory buffer.

In another variation, at the time $t_6$ the prospective video 146 is copied to and stored in the non-volatile memory 252nv. In an example of the present variation, the prospective video 146 is stored uncompressed. In another example of the present variation, the prospective video 146 is compressed and then stored. Compression codecs, such as H.264, are well known. Lossless and lossy coding formats may be used to compress. The time $t_6$ may be selected by the user when the procedure is completed by toggling the prospective recording button. Alternatively, the time $t_6$ may occur when power is turned off at the video processor 100, for example by actuation of a power button. Video compression requires controller processing cycles (a controller 250 is described with reference to FIG. 14) and, therefore, it is preferable to move the prospective video, and compress it, after the endoscopic procedure is completed. Alternatively, for example if the prospective video is long and filling the volatile memory 252v to a threshold amount, for example 80%, the prospective video, or parts thereof starting at the beginning, e.g. at time $t_1$, can be copied to the non-volatile memory 252nv uncompressed. This enables movement back and forth between volatile and non-volatile memory, for example if the operator wishes to store a long retrospective video, without taxing the controller 250 with compression and decompression duties. Then, after the procedure is completed, the controller 250 may compress the uncompressed prospective video. However, the controller 250 may compress on the fly, as the prospective video is saved. Of course the retrospective videos can also be compressed, and they may be compressed in a lossless format, for example, as they are smaller.

Figure 2C:
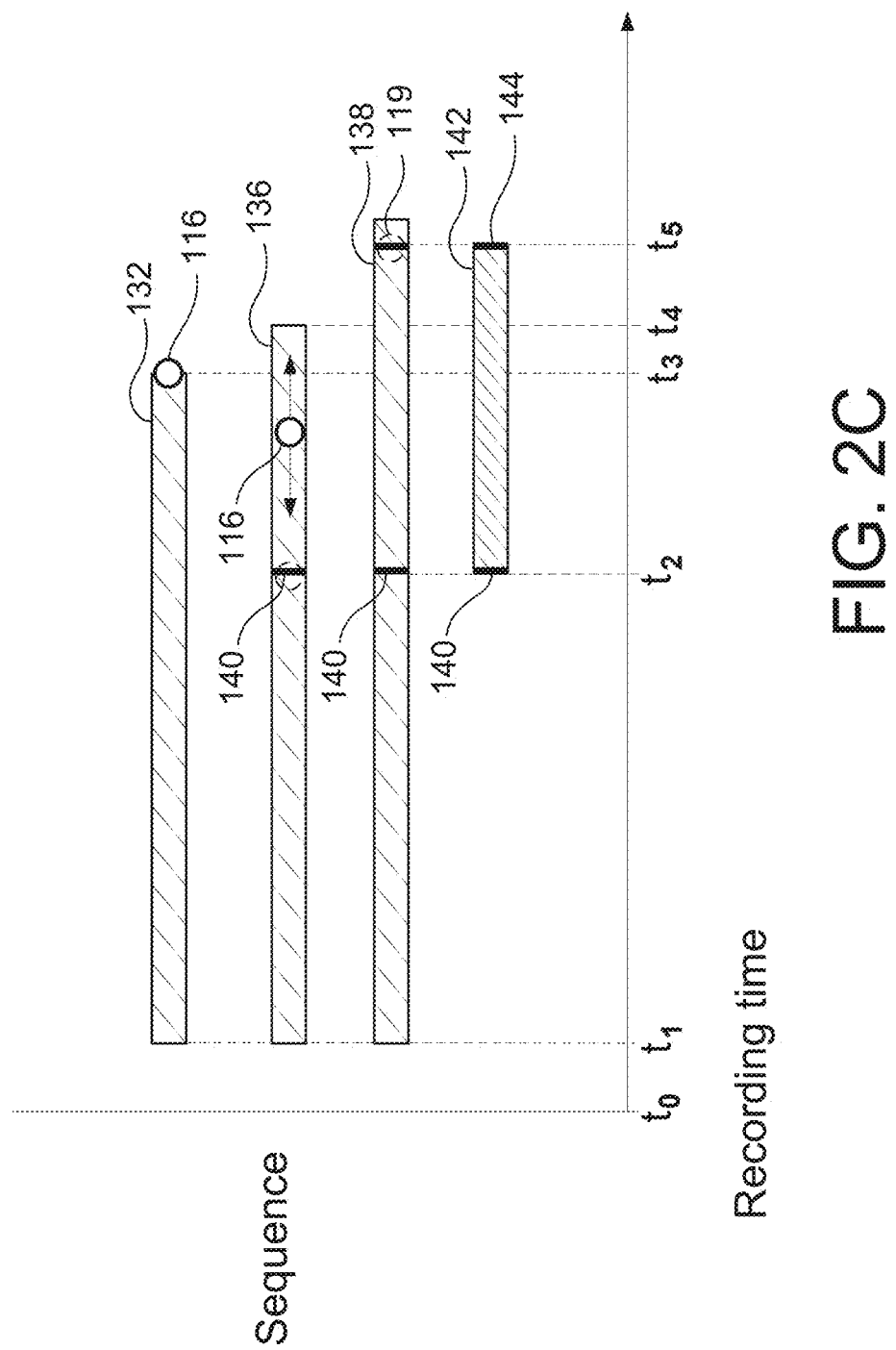
FIG. 2C is a timing chart illustrative of a sequence of events in a variation of the embodiment of FIG. 2A.

In another variation, described with reference to FIG. 2C, the operator can independently select the last frame of the retrospective video 142. FIG. 2C is a timing chart illustrative of a sequence of events in accordance with a variation of the embodiment of the GUI 102' depicted in FIG. 2A. The events at times $t_3$ to $t_3$ are as depicted with reference to FIG. 2A. After the operator selects the frame 140, the video processor may continue adding frames to the prospective video. The user then causes generation of a second user input 119a. At the time $t_5$ the video processor 100 receives the second user input 119a, which causes selection of the frame 144. Generation of the second user input 119a will be described with reference to FIG. 3, and then the description of FIG. 2C will be completed.

Figure 3:
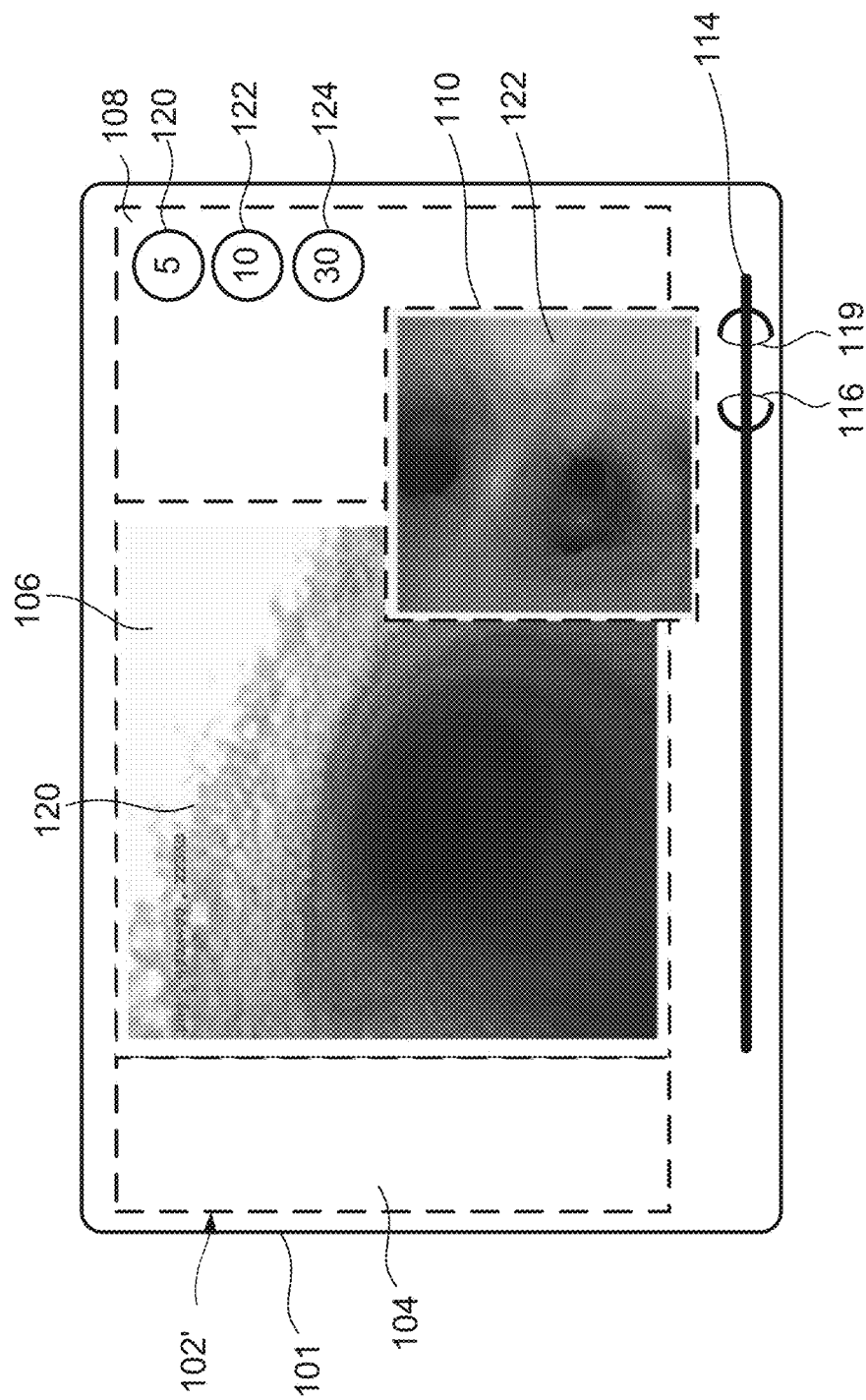
FIG. 3 shows a view of a variation of the embodiment of the graphical user interface of FIG. 1.

Referring now to FIG. 3, in a variation of the GUI 102' described with reference to FIG. 1, two frame selectors, 116 and 119, are presented with the timing bar 114. The first frame selector 116 and the second frame selector 119 may be used to generate the first and second user inputs 116a, 119a. The operator may wish to do so to shorten the length of the retrospective video to keep its most valuable parts only. Thusly, the time $t_5$ can actually occur anytime after time $t_2$. In this context, the terms first and second correspond to the location of the respective frame selector on the timing bar. In another variation, also shown in FIG. 3, duration buttons 120, 122, 124 are presented by the GUI 102', corresponding to predetermined retrospective video durations. In this way an operator can select the first frame and the video duration instead of selecting the last frame or stopping recording of frames for the retrospective video. Activation of the duration button 120 selects a duration of 5 seconds, activation of the duration button 122 selects a duration of 10 seconds, and activation of the duration button 124 selects a duration of 30 seconds. Of course the durations can be modified as desired, for example based on the endoscope and procedure. The second user input 119a may be generated when the operator activates a duration button. Activation of a duration button may also initiate saving of the retrospective video.

Returning to FIG. 2C, while the present variation can be implemented as described, with the operator selecting the first frame first and the last frame last, this is not necessary. The operator can also move the frame selector 119 first and subsequently move the first frame selector 116 to select the first frame. In this case, the first user input 116a may be generated when the operator releases the frame selector 119, and the second user input 119a may be generated when the operator releases the frame selector 116. In other words, the terms first and second in the present context correspond to the order of movement and not the position in the timing bar.

In another variation the video processor saves the retrospective video when the retrospective recording button 112 is toggled. Thus, the operator can move the first and second frame selectors more than once and only set and save the retrospective video by activating/toggling the retrospective recording button 112.

In one variation described above, the video processor saves the retrospective video when a duration button 120, 122, 124 is activated. Thus, the operator can move the first frame selector more than once and only set and save the retrospective video by activating/toggling the duration button, which determines the last frame of the retrospective video.

Figure 4:
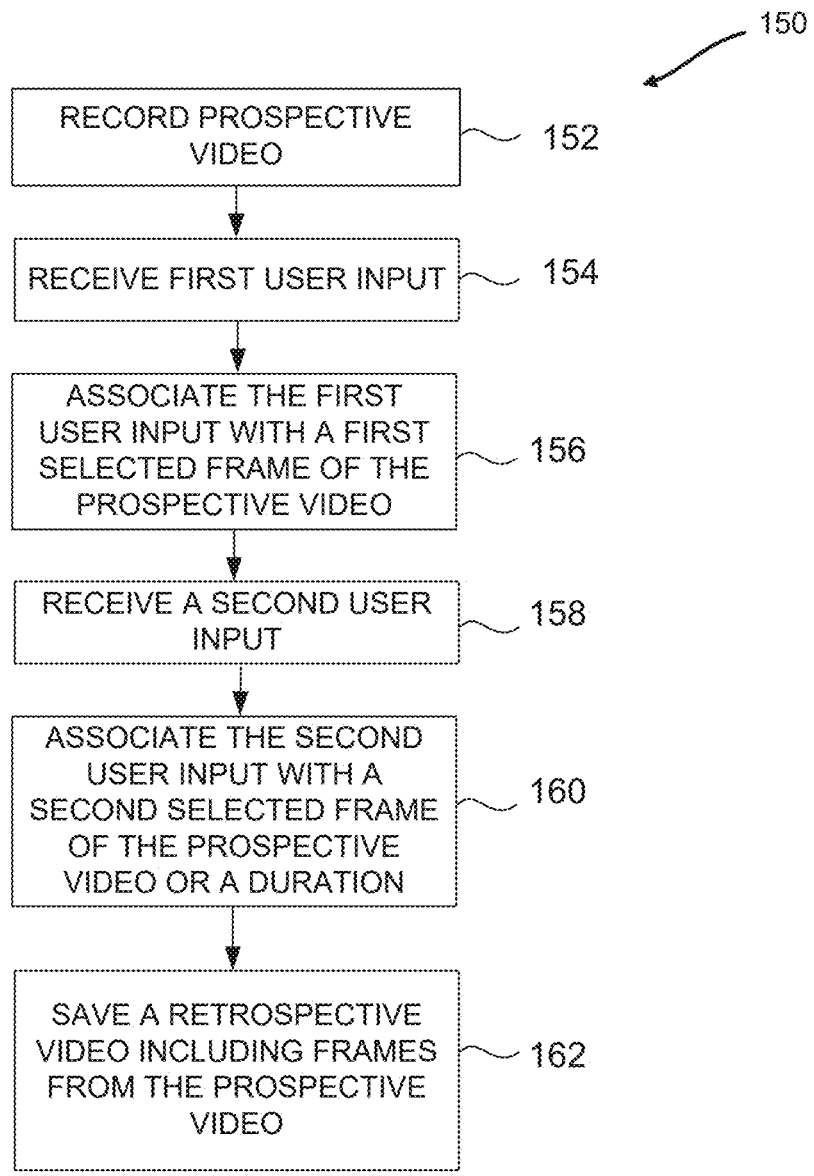
FIG. 4 is a flowchart of the embodiment of the method depicted in FIG. 2C.

Referring now to FIG. 4, a flowchart 150 is shown illustrating an embodiment of the method of creating a retrospective video/clip. Beginning at 152, the video processor, such as the video processor 100, records in its memory live images received from a visualization device to which it is communicatively connected. The live images may be buffered in random access memory (RAM) (also referred to as image buffer 252v) before presentation with a display. RAM is typically preferred due to its fast read and write speeds, but RAM is more expensive than non-volatile memory, which is very relevant when a lot of memory is needed. Accordingly, live images may also be saved in non-volatile memory. During the landmark validation process (described below), portions of the prospective video may be copied to RAM to speed up the presentation of the images.

At 154, the video processor receives a first user input. The first user input can be a signal from the display, if it is a touch-display, or a signal from another user input device, such as a mouse, a vocal command etc. The first user input may be the first user input 116a.

At 156, the video processor associates the first user input with a first selected frame of the prospective video. The first selected frame will become the first or the last frame of the retrospective video/clip. While in the figures above the selection is described from first to last, it is also possible to select the last frame first and the first frame last. The association is based on the position of the frame selector on the timing bar and the correspondence of the timing bar to the prospective video. Thus, for each position in the timing bar there may be a corresponding frame of the prospective video, and placing a frame selector on a position in the timing bar therefore associates that position with the corresponding frame of the prospective video. As discussed below, the spacing between frames on the timing bar can be changed with a focus feature.

At 158, the video processor receives a second user input. The second user input can be received in the same manner as the first user input. The second user input may be the second user input 119a generated with the second frame selector 119. The second user input may be a duration input 120a, 122a, or 124a, generated when the operator activates a duration button 120, 122 or 124, as described above with reference to FIG. 3.

At 160, the video processor associates the second user input with a second selected frame of the prospective video or with a duration. The second selected frame will become the last or the first frame of the retrospective video/clip, depending on the position in the timing bar of the first selected frame. Alternatively, the first selected frame will be the first frame of the retrospective video and the duration will determine how many additional frames will be included in the retrospective video following the first selected frame. The number of frames is determined based on the duration and the frames-per-second of the prospective video. In variations where the last frame 144 is automatically selected by the video processor as the last frame of the prospective video when the first user input 116a is received, a second user input is not necessary.

At 162, the video processor saves a retrospective video/clip including frames from the prospective video comprising the first and last frames and frames between them, or, alternatively, the first frame and the frames encompassed by the selected duration.

The timing bar/frame selector association can be designed to provide different frame selection resolutions. In this context, frame selection resolution refers to the spacing between frames. As the spacing increases, it becomes easier to select a particular frame. But that also requires more movement of the frame selector to move further back or forward in time. Additionally, the space on the display to position the timing bar is limited. In one example, generally discussed above, the timing bar/frame selector association is fixed so that the length of the timing bar corresponds to the length of the prospective video, which is fixed, for example fixed upon receipt of the first user input 116a.

Figure 5:
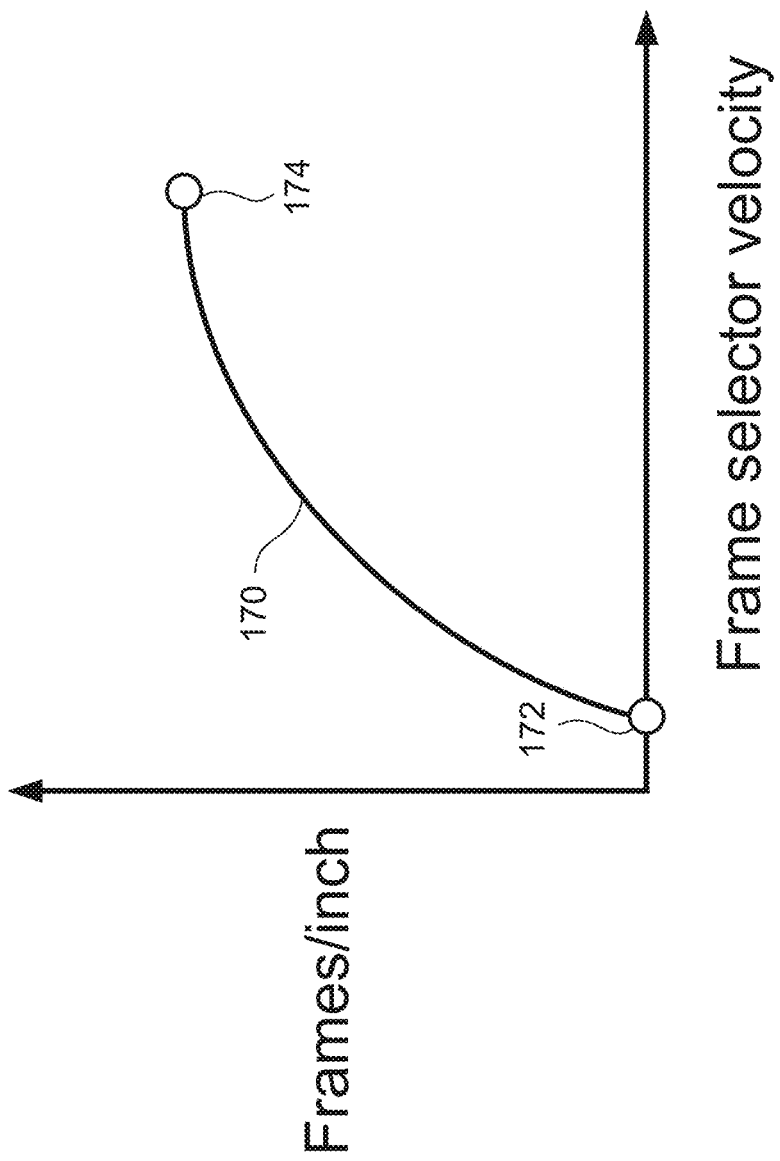
FIG. 5 shows a curve depicting frame selector velocity.

In another example, also applicable to the embodiments and variations thereof described above, the timing bar/frame selector association is varied and is dependent on the speed at which the operator moves the frame selector. Thus, when the operator moves the frame selector quickly, the spacing between frames is made shorter so that the operator gets to where they want to go more quickly. As the movement of the frame selector slows, the spacing increases, giving the operator a better chance at finding a particular frame. This is illustrated in FIG. 5, where a curve 170 represents variable timing bar/frame selector association. At point 172 the frames per inch are at a predetermined minimum, a lower limit, and at point 174 the frames per inch are at a predetermined maximum, an upper limit. The curve can also be a straight line. The length of the timing bar does not need to correspond to the duration of the prospective video. Instead, the variable timing bar/frame selector association determines how many frames are encompassed by the timing bar. This can be envisioned as a moving window encompassing a portion of the prospective video and moving right or left dependent on the velocity of the movement of the frame selector. Additionally, as described above, the frame rate may be reduced and may be reduced in a variable manner based on the speed at which the operator moves the frame selector.

In a further example, also applicable to the embodiments and variations thereof described above, the timing bar/frame selector association is varied and is dependent on a distance from a middle of the timing bar, which may be referred to as an initial position. The initial position can also be the position fo the frame selector when the user first activates the respective frame selector. Thus, when the operator moves the frame selector toward one end or the other of the timing bar, the spacing between frames is made shorter so that the operator gets to where they want to go more quickly. As the operator moves the frame selector toward the middle of the timing bar, the spacing increases, giving the operator a better chance at finding a particular frame. Thus, the operator can easily control how fast to move how far in the prospective video. The length of the timing bar does not need to correspond to the duration of the prospective video. Instead, the variable timing bar/frame selector association determines how many frames are encompassed by the timing bar. Additionally, as described above, the frame rate may be reduced and may be reduced in a variable manner based on the distance from a middle of the timing bar.

More generally, the timing bar length can be associated with a variable portion of the prospective video, for example by adopting a variable timing bar/frame selector association as described in the preceding examples. But timing bar length can also be associated with a variable portion of the prospective video using a moving window concept without adopting a variable timing bar/frame selector association. In this case the moving window moves through the timing bar once the user moves the frame selector, in either direction.

In a further example, the controller is configured to update the image buffer with the frames corresponding to images coming in from the visualization device at a first frame-rate, and to cause the touch-display to present at least some of the frames, in response to receipt of the first user inputs corresponding to movement of the frame selector, at a variable frame-rate dependent on the movement velocity of the frame selector and/or the position of the frame selector. Additionally, the controller can cause the touch-display to, in response to receipt of the first user inputs, not present a number of frames located after each of the at least some presented frames, the number comprising an integer between 1 and 5. In other words, to reduce computation costs during the presentation of frames in the pip panel, some frames can be skipped (not shown). This is equivalent, in practice, of speeding up the frame-rate or reducing the resolution. These variations can be combined. In one combination, the velocity of the frame selector or the distance from the initial position is used initially. The position of the frame selector relative to when the velocity reaches a threshold value indicative of slowing, which also indicates that the operator perceives approaching a clinically relevant frame, can be used as another variable to control the frame-rate, resolution, or the number of frames skipped, if any. The combination is to accelerate reaching the clinically relevant frame quicker with less computational cost.

Figure 6:
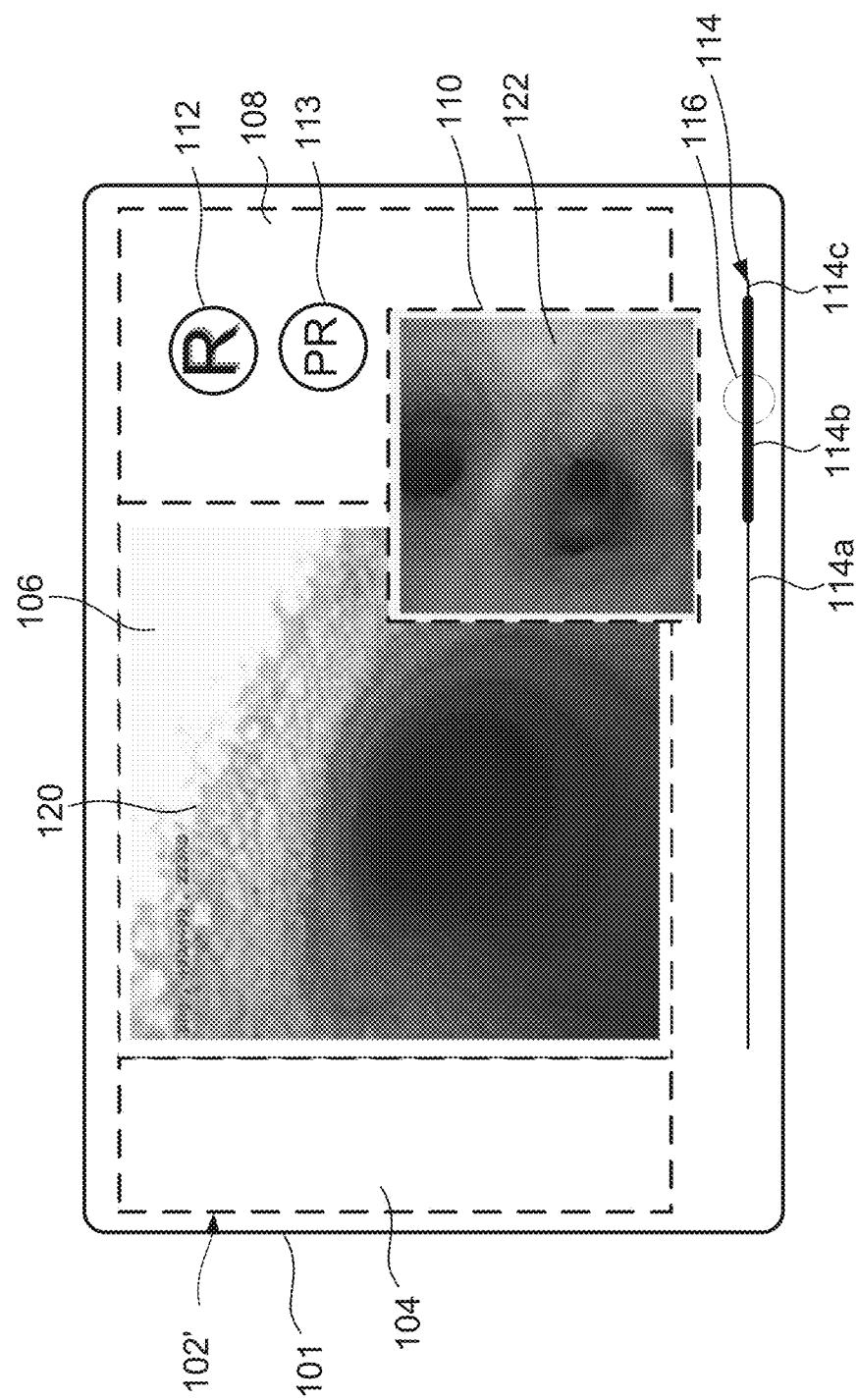
FIGS. 6 and 6A-6C show views of variations of the embodiment of the graphical user interface of FIG. 1.

FIG. 6 illustrates a zoom feature of the timing bar 114, which can be incorporated in any of the described embodiments and variations thereof, and which is another example of a variable timing bar/frame selector association. FIG. 6 is the same as FIG. 1 except that the timing bar 114 has been divided into three portions, 114a, 114b, and 114c, named front, focus, and back timing bars. The zoom feature is useful, in particular, when the prospective video duration is long or very long. Assuming for the sake of illustration that the video was captured at 30 frames per second (fps), each minute of video contains 1,800 frames, and each hour contains 108,000 frames. If the timing bar is 5 inches long, each inch represents 21,600 frames of the 1 hour long video. This makes it difficult to select the first and last frames with precision. The timing bar shown in FIG. 5 is therefore modified so that the front and back timing bars, 114a and 114c, encompass more frames per inch than the focus bar 114b. As shown, the number of frames corresponding to ⅖ of the bar, 43,200 frames, are encompassed by each of the front and back timing bars, together encompassing 86,400 frames in the original length of 4 inches. That leaves 21,600 frames encompassed by the focus bar 114b in the original length of 1 inch. The front and back timing bars, 114a and 114c are then reduced in size 50% so that together they take up ⅖ of the timing bar instead of ⅘. That leaves ⅗ of the timing bar for the focus bar 114b, encompassing 21,600 frames in 3 inches, or 7,200 frames per inch, compared to the original 21,600 frames per inch, a 300% improvement in resolution. The focus bar 114b extends on both sides of the frame selector 116 and moves with it. Therefore, the resolution of frames surrounding the frame selector 116 is greater than the resolution before and after the focus bar 114b in its then present location. The resolution can be improved further, for example 500%, 800%, 1000%, 1,200%, and more, until the number of frames per inch is adequate to facilitate selection of a frame. The frame selector resolution can also be changed dynamically based on the duration of the prospective video so that regardless its duration the resolution of the focus bar 114b is the same, giving the operator a consistent feel.

Figure 6A:
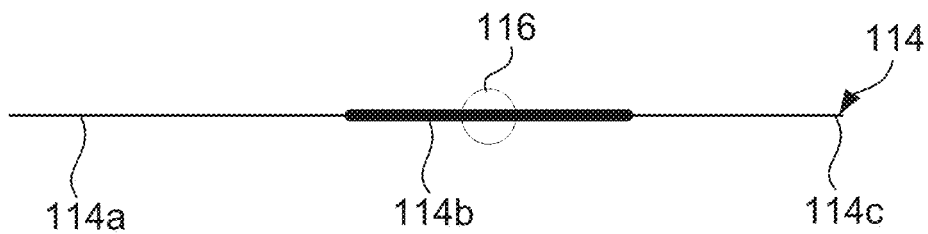
Figure 6B:
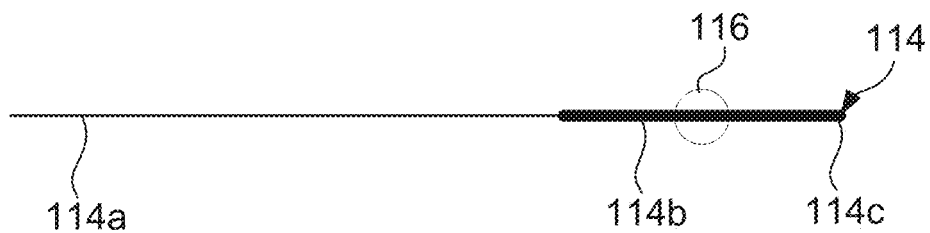
Figure 6C:
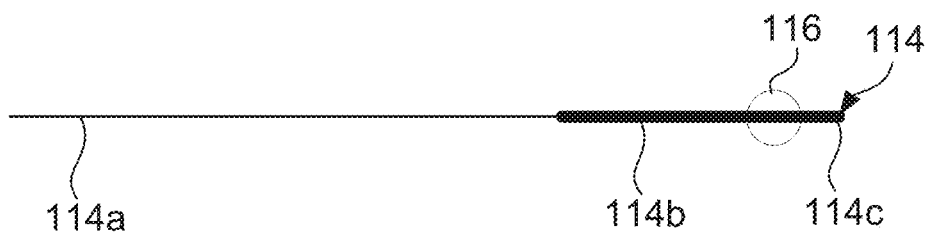

In one variation of the foregoing the timing bar shown in FIG. 6, the frame selector 116 may be positioned in the middle of the focus bar 114b (as shown in FIG. 6A) and the focus bar 114b can move with it until the end of the prospective video is reached (as shown in FIG. 6B), at which time the frame selector 116 can move further without the focus bar moving (as shown in FIG. 6C), because the focus bar reached the end of the prospective video.

As described with reference to FIG. 1, the video frames shown in the pip panel 110 can be used by the operator to select the first frame of the retrospective video. The video frames can be shown in any other way. The pip panel 110 does not have to be a pop-up panel. The video frames can also be shown in the central panel by swapping the live view with the prospective video. The swap can be responsive to receiving the first user input 116a, for example. Similarly, the timing bar and the frame selector(s) do not have to be presented all the time, they can be presented responsive to the user activating the retrospective recording button 112. In this manner the display can show what is important at the time without showing artifacts that are not needed during the entire endoscopic procedure.

The prospective video frames can be used by the operator to find a landmark and to select the first frame based on the identification of the landmark. A landmark may be a portion of the patient's body that must be examined during the endoscopic procedure. Thus, by finding the landmark the operator can use the GUI 102' to create a video documenting examination of the landmark while excluding irrelevant portions of the video. The prospective video frames can also be used by the operator to document the detection of anomalous tissue, such as malignant tissue, a scar, a polyp, etc. The operator can then record a video that starts with the anomalous tissue. The operator can also move further back in time to record a prior landmark so as to have evidence of the anomalous tissue relative to the prior landmark. The operator can also record the anomalous tissue and forward to a subsequent landmark. Either way, the operator may desire to reference the location of the anomalous tissue to a known landmark and thereby be able to re-locate the anomalous tissue during another endoscopic procedure, to compare before and after and determine a course of action accordingly.

Figure 7:
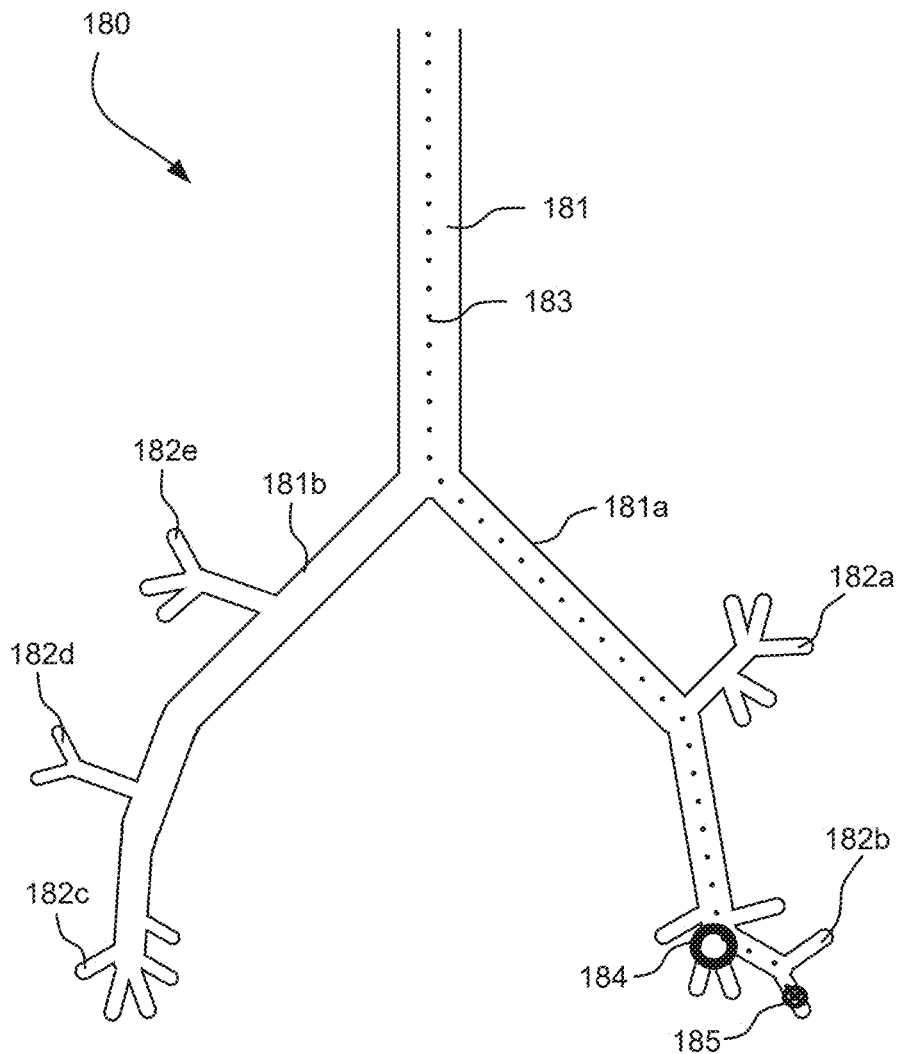
FIG. 7 shows a visual organ model.

FIG. 7 shows a visual organ model 180 of the human airways. The visual organ model visually displays the organ to be examined, including landmarks to be inspected or already inspected during the endoscopic bronchoscopy. The operator can use the model to navigate the endoscope to ensure that none of the landmarks are missed. As described above, the operator may, after reaching a landmark, retrospectively save a clip showing the landmark as evidence that the landmark was inspected. The visual model 180 is not necessarily in scale and the relative size of individual parts or elements therein does not necessarily correspond to the relative sizes of the parts or elements of the human airways which they model. The visual model 180 includes representations of a trachea 181, a left primary bronchus 181a, a right primary bronchus 181b, secondary bronchi and some bronchioles 182a-182e, each of which can be a landmark. The visual model 180 may be displayed on the display, for example on the right panel, and can include overlaid objects, such as a desired route 183 for navigating the left primary bronchus 181a, and landmarks already seen in the prospective video, such as landmark 184 (shown on image 122) and an anomalous tissue 185. The operator, in this case, may wish to save a retrospective clip showing the landmark 184 and the anomalous tissue 185. As described above, the operator may want to save the retrospective clip before navigating away from the landmark 184 toward the landmark 182a, for example, so that they do not have to, later, view an entire prospective video to create the clip. The description of the visual organ model 180 will help understand the value of automating or simplifying the process of documenting the examination of landmarks.

Figure 8:
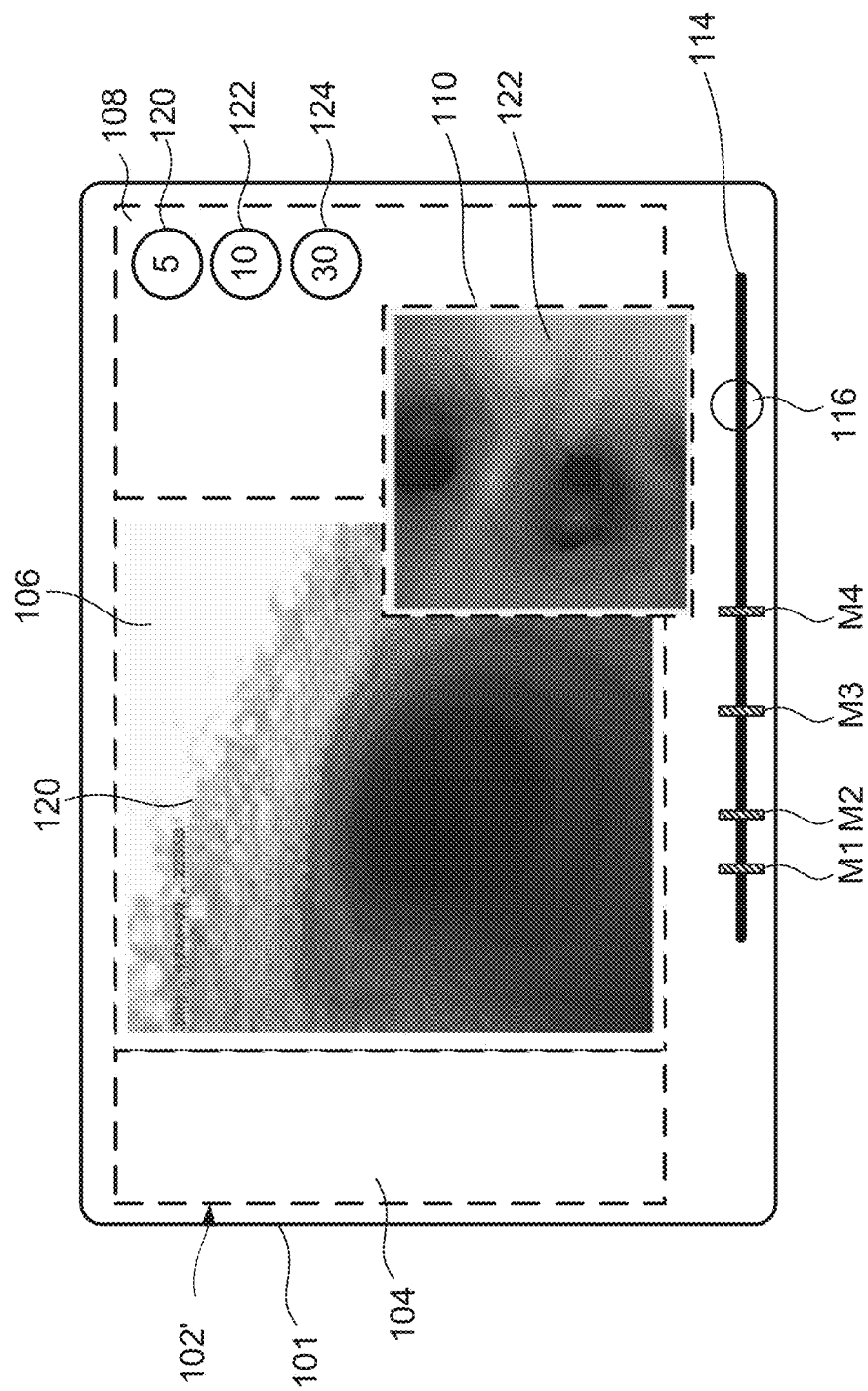
FIGS. 8, 9 and 9A-9D show views of variations of the embodiment of the graphical user interface of FIG. 1.

FIG. 8 illustrates a landmark estimation feature and an estimated landmark validation process, which can be incorporated in the aforementioned embodiments and variations thereof. This feature enables the operator to extract and save a plurality of clips corresponding to the plurality of actual landmarks, thereby documenting the entire procedure at once with the least number of actions. This process saves times by guiding the operator to an area near each landmark and allowing the operator to save all the clips at once instead of individually. Additionally, the operator can determine by looking at consecutive markers whether a marker is missing that should be located between them, and then the operator can inspect the video portion between the markers to identify the missing landmark.

FIG. 8 is the same as FIG. 3 except that estimated landmark markers M1-M4 have been added to the timing bar 114. The estimated landmarks are estimates of where the frames showing landmarks are located in the prospective video. Various ways to estimate the durations in the prospective video where landmarks can potentially be seen are described in detail below. In one variation, the durations are based on the estimated time necessary to navigate the endoscope from one landmark to the next based on a particular endoscopic procedure. For example, when performing a bronchoscopy it will take a first amount of time to navigate through the mouth to the vocal cords, a second amount of time to navigate from the vocal chords to the bronchi, etc. A typical amount of the first, second, third, etc. times can be used to place the estimated landmark markers on the timeline bar.

The foregoing sequence may be described from an apparatus perspective, as follows. A video processor configured to record images captured by an image sensor of a visualization device, the video processor comprising: a processing circuit including volatile memory, non-volatile memory, and a controller, at least a portion of the volatile memory designated as an image buffer; a housing at least partly enclosing the processing circuit; a connection port configured to receive a visualization device connector and to receive through the visualization device connector image signals corresponding to the images captured by the image sensor; and a touch-display at least partly enclosed by the housing and communicatively connected with the controller, the touch-display configured to present a graphical user interface (GUI), live views of the images, a frame selector of the GUI, and frames stored in the image buffer and comprised of image data corresponding to the image signals, wherein the controller is configured to: (i) cause the touch-display to present with the GUI a timing bar, (j) identify landmark frames in the frames stored in the updated image buffer, the landmark frames being frames estimated by the controller to depict known landmarks, and (k) cause the touch-display to present with the GUI estimated landmark markers on the timing bar, positions of the estimated landmark markers corresponding to positions of the landmark frames in the updated image buffer. Further, the controller may store retrospective video files in the non-volatile memory, each of the retrospective video files including a frame validated by the operator as showing a landmark.

The foregoing sequence may be described from an apparatus perspective, as follows. A video processor configured to record images captured by an image sensor of a visualization device, the video processor comprising: a processing circuit including volatile memory, non-volatile memory, and a controller, at least a portion of the volatile memory designated as an image buffer; a housing at least partly enclosing the processing circuit; and a connection port configured to receive a visualization device connector and to receive through the visualization device connector image signals corresponding to the images captured by the image sensor. The video processor comprises an output video port configured to communicate with a separate touch-display. The touch-display is configured to present a graphical user interface (GUI), live views of the images, a frame selector of the GUI, and frames stored in the image buffer and comprised of image data corresponding to the image signals, wherein the controller is configured to: (a) cause the touch-display to present the GUI, (b) update the image buffer with the frames as the image signals are received at the connection port, (c) repeatedly receive a first user input responsive to an operator moving the frame selector by touching the touch-display, (d) cause the touch-display to present at least some of the frames in response to receipt of the first user inputs, (e) receive a second user input responsive to the operator ceasing touching of the touch-display at the frame selector, (f) identify as a first retrospective frame a frame, of the at least some of the frames, presented at the time the controller received the second user input, (g) identify a second retrospective frame, and (h) store a retrospective video file in the non-volatile memory, the retrospective video file beginning and ending with the first retrospective frame and the second retrospective frame and including frames, of the frames, between the first retrospective frame and the second retrospective frame, (i) cause the touch-display to present with the GUI a timing bar, (j) identify landmark frames in the frames stored in the updated image buffer, the landmark frames being frames estimated by the controller to depict known landmarks, and (k) cause the touch-display to present with the GUI estimated landmark markers on the timing bar, positions of the estimated landmark markers corresponding to positions of the landmark frames in the updated image buffer. Further, the controller may store retrospective video files in the non-volatile memory, each of the retrospective video files including a frame validated by the operator as showing a landmark.

The foregoing sequence may be described from an apparatus perspective, as follows. A video processor configured to record images captured by an image sensor of a visualization device, the video processor comprising: a processing circuit including volatile memory, non-volatile memory, and a controller, at least a portion of the volatile memory designated as an image buffer; a housing at least partly enclosing the processing circuit; a connection port configured to receive a visualization device connector and to receive through the visualization device connector image signals corresponding to the images captured by the image sensor; and a touch-display at least partly enclosed by the housing and communicatively connected with the controller, the touch-display configured to present a graphical user interface (GUI), live views of the images, a frame selector of the GUI, and frames stored in the image buffer and comprised of image data corresponding to the image signals, wherein the controller is configured to: (a) cause the touch-display to present the GUI, (b) update the image buffer with the frames as the image signals are received at the connection port, (c) repeatedly receive a first user input responsive to an operator moving the frame selector by touching the touch-display, (d) cause the touch-display to present at least some of the frames in response to receipt of the first user inputs, (e) receive a second user input responsive to the operator ceasing touching of the touch-display at the frame selector, (f) identify as a first retrospective frame a frame, of the at least some of the frames, presented at the time the controller received the second user input, (g) identify a second retrospective frame, and (h) store a retrospective video file in the non-volatile memory, the retrospective video file beginning and ending with the first retrospective frame and the second retrospective frame and including frames, of the frames, between the first retrospective frame and the second retrospective frame, (i) cause the touch-display to present with the GUI a timing bar, (j) identify landmark frames in the frames stored in the updated image buffer, the landmark frames being frames estimated by the controller to depict known landmarks, and (k) cause the touch-display to present with the GUI estimated landmark markers on the timing bar, positions of the estimated landmark markers corresponding to positions of the landmark frames in the updated image buffer. Further, the controller may store retrospective video files in the non-volatile memory, each of the retrospective video files including a frame validated by the operator as showing a landmark.

In another variation, the estimated landmark markers are positioned based on image analysis of the prospective video and, optionally, a navigation route. The navigation route includes the landmarks to be traversed and/or examined during the endoscopic procedure and the order in which the landmarks should be seen. Object recognition logic may be used to match characteristics of the landmarks with characteristics of objects recognized in the images/frames of the prospective video. The characteristics may include relative size and shape, pixel intensity and the like. A bifurcation of the trachea, for example, shows the right and left bronchi and their periphery/circumference are larger than bifurcations deeper into the lungs. The object recognition logic can match a landmark with an object in a frame and flag the frame as containing the landmark.

The object recognition logic may impose a heavy burden in terms of processing cycles, which may be undesirable while live images are being presented. In some variations, the process of estimating landmarks is carried out by the object recognition logic on downscaled images/frames. The object recognition logic (described with reference to FIG. 14) may downscale an image by, for example, averaging groups of pixels to reduce the resolution of a frame from, for example, 800×800 to 200×200, and then perform the object recognition on the downscaled image. Other downscaling techniques may be used. Additionally or alternatively, the object recognition logic may estimate landmarks at a reduced frame rate. Thus, for example by skipping every other frame, the processing burden is reduced by 50%. Frame rates may be, for example, 30, 60, and 120 frames per second. Resolutions may be, for example, 400×400, 800×800, 1500×1500, etc.

In one example of the foregoing variation, the object recognition logic uses a trained database to perform the object recognition. Training and use of a trained database are disclosed in commonly-owned U.S. Publication No. 2023-0172428, published Jun. 8, 2023, U.S. Publication No. 2023-0233098, published Jul. 27, 2023, and U.S. patent application Ser. No. 18/206,935, filed Jun. 7, 2023; the disclosures of the aforementioned publications and applications are incorporated by reference herein in their entirety. In another example, the object recognition logic analyzes images/frames to identify lines/contours that define shapes, and mathematical representations of the shapes are then compared to mathematical representations of landmarks to make a match. In a further example, the object recognition logic compares images/frames sequentially to determine movement by correlating pixels of particular intensity/color from one frame to the next and then triangulating the movement of the image sensor/camera at the tip end of the endoscope. When pixel correlations vary by a significant amount between frames or groups of frames (e.g. corresponding to a predetermined amount of time, for example 30 frames), the object recognition logic determines that a landmark has been reached.

The estimation of the landmarks does not need to be precise but it is helpful, and time saving, to estimate precisely. The estimated landmark marker may be placed a predetermined number of frames prior to the estimate. In this way the operator will always move the frame selector 116 from left to right, for example, to visually identify the landmark. This is not necessary but might save time. Once the landmark is visually identified, the operator can mark it by changing characteristics of the landmark marker to denote that it is no longer an estimate. In FIG. 8 four estimated landmark markers are shown. The first estimated landmark marker, M1, was presented first and the operator could have visually identified the landmark before the next estimated landmark marker, M2, was shown. The operator could have, also, created a retrospective clip showing the actual landmark L1 before proceeding with the procedure. How to create retrospective clips was described at least with reference to FIGS. 2A and 2B.

Figure 9:
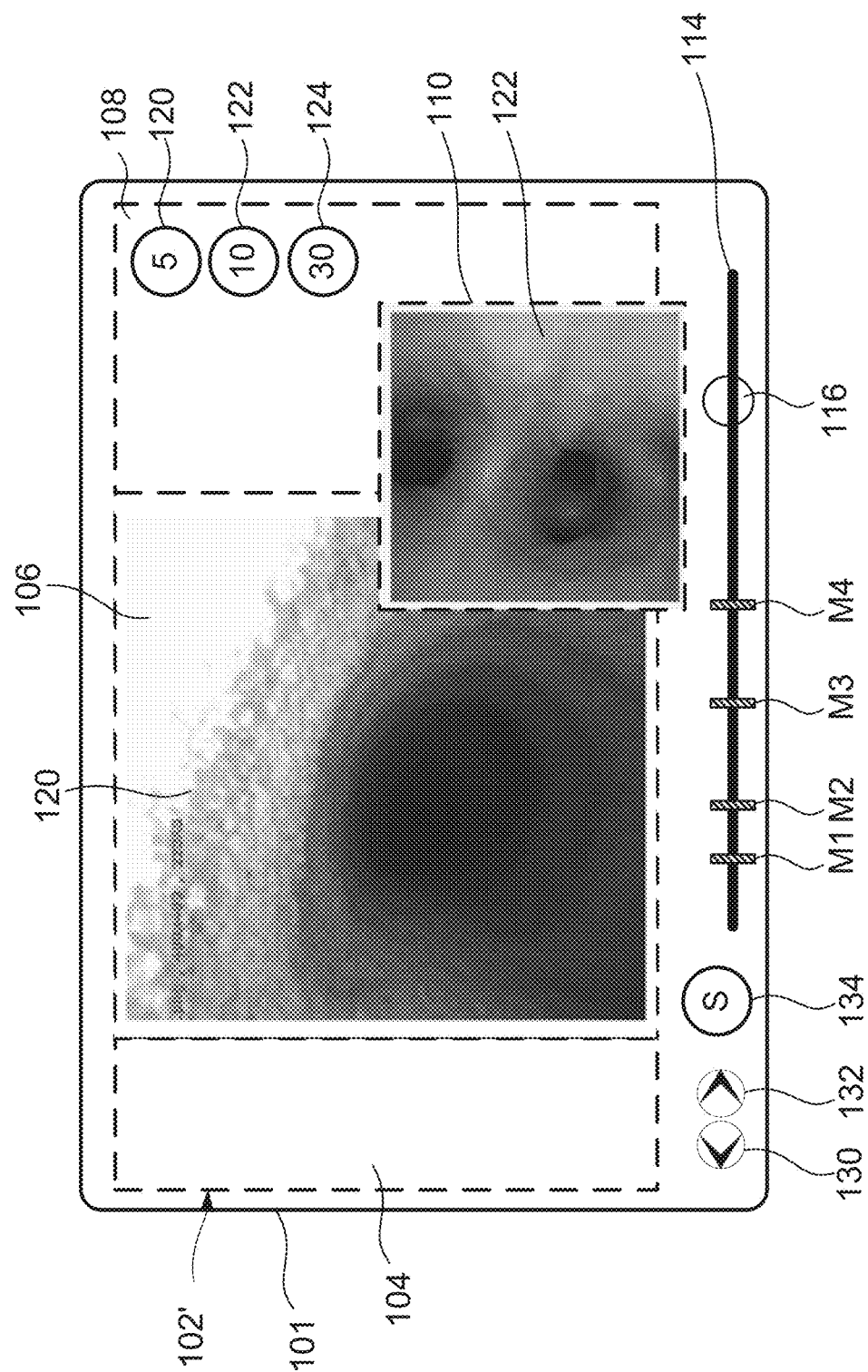

FIG. 9 is the same as FIG. 8 except that left and right marker navigation buttons 130, 132, and a save, or validation, button 134, are shown. The operator can activate the left and right marker navigation buttons 130, 132 to jump from a current location to the immediately left or right estimated landmark marker. The operator can also activate the save button 134 to change an estimated landmark marker to an actual landmark marker. This process will now be illustrated with reference to FIGS. 9A-9D.

Figure 9A:
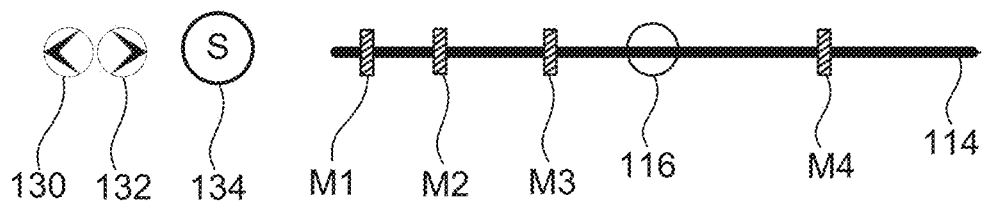
Figure 9B:
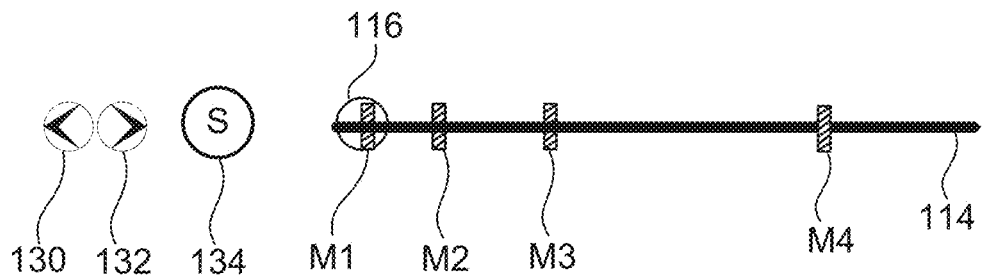
Figure 9C:
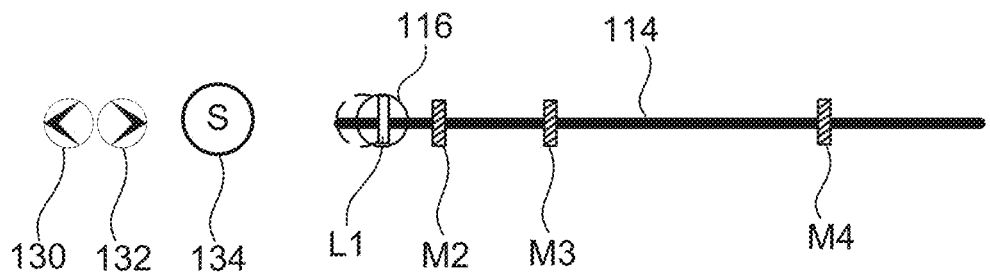

FIG. 9A shows the timing bar 114, left and right marker navigation buttons 130, 132, and the save, or validation, button 134, as were shown in FIG. 9. FIG. 9B shows that the operator activated the left marker navigation button 130 three times to move the frame selector 116 to the estimated landmark marker M1. Also, in this example the frame selector 116 is centered just slightly left of the estimated landmark marker M1. This will enable the operator to move the frame selector 116 forward in time (to the right) to visually find the actual landmark by observing the frames presented in the pip panel. FIG. 9C shows that the operator visually found the actual landmark by moving the frame selector 116 forward in time and then activated the save button 134 to validate the landmark and convert the estimated landmark marker M1 to an actual landmark marker L1. The actual landmark marker is visually different than the estimated landmark marker. This part of the process, which may be referred to as the estimated landmark validation process, is repeated for each estimated landmark and, potentially, to find missing landmarks.

Figure 9D:
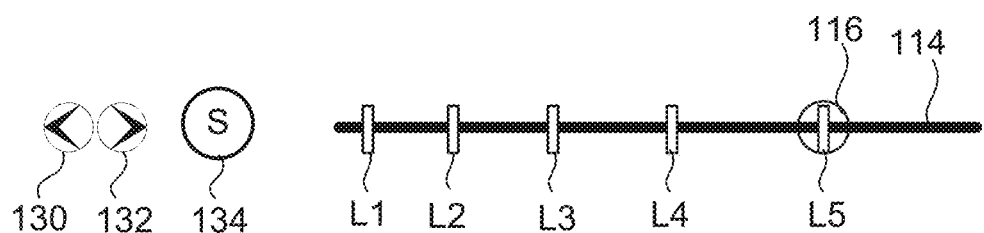

In one variation of the present embodiment, the landmarks, estimated and actual, are overlayed by the object detection logic in the visual organ model 180 so that the operator can keep track of what has and has not been inspected. The operator may, therefore, determine that the estimated landmarks do not show a landmark, for example between estimated landmark markers M3 and M4. The operator may determine this, for example, if the spacing between estimated landmark markers is too great given the positions of the estimated landmark markers in the visual organ model 180. Then, the operator can move the frame selector from the estimated landmark marker M3 to the estimated landmark marker M4 to visually identify the missing landmark. The operator can then press the save button 134 to insert the missing marker. FIG. 9D shows that the operator visually found the four estimated landmarks and an additional landmark, L4.

At this point the operator can actuate the retrospective recording button 112 or one of the duration buttons 120, 122, 124 to extract and save five clips corresponding to the five landmarks, thereby evidencing that all the landmarks were found. Each of the clips may be provided, in its metadata, with clip identification information. The clip identification information may comprise identification codes for the procedure, operator, location, time, date, endoscope model, video processor serial number, and any other relevant information. The operator can also choose to save clips individually or in groups comprising less than all the landmarks. For example, the operator can save less than all the marks as actual marks before actuating the retrospective recording button 112 or one of the duration buttons 120, 122, 124. The video processor may be configured to remember that the clips were created and, when the save button is activated again, only save additional clips.

As described below, this process can also be performed after the procedure is concluded, at which time the video processor will not be storing live video from the endoscope and therefore additional processing capacity can be allocated to the object recognition logic. However, it may be advantageous to perform this process live, while the endoscope is providing images, because in that case the operator can check for landmarks and can still navigate to find a missing landmark. For example, if the operator completes examination of the left lung, it may be advantageous then to find all the left lung landmarks before examining the right lung. If a landmark is missing, the operator may be able to locate the landmark in the process of retracting the endoscope prior to navigating into the right lung. This would save time and, potentially, the need to perform the procedure again or to reintroduce the endoscope into the left lung after completing examination of the right lung.

Figure 10:
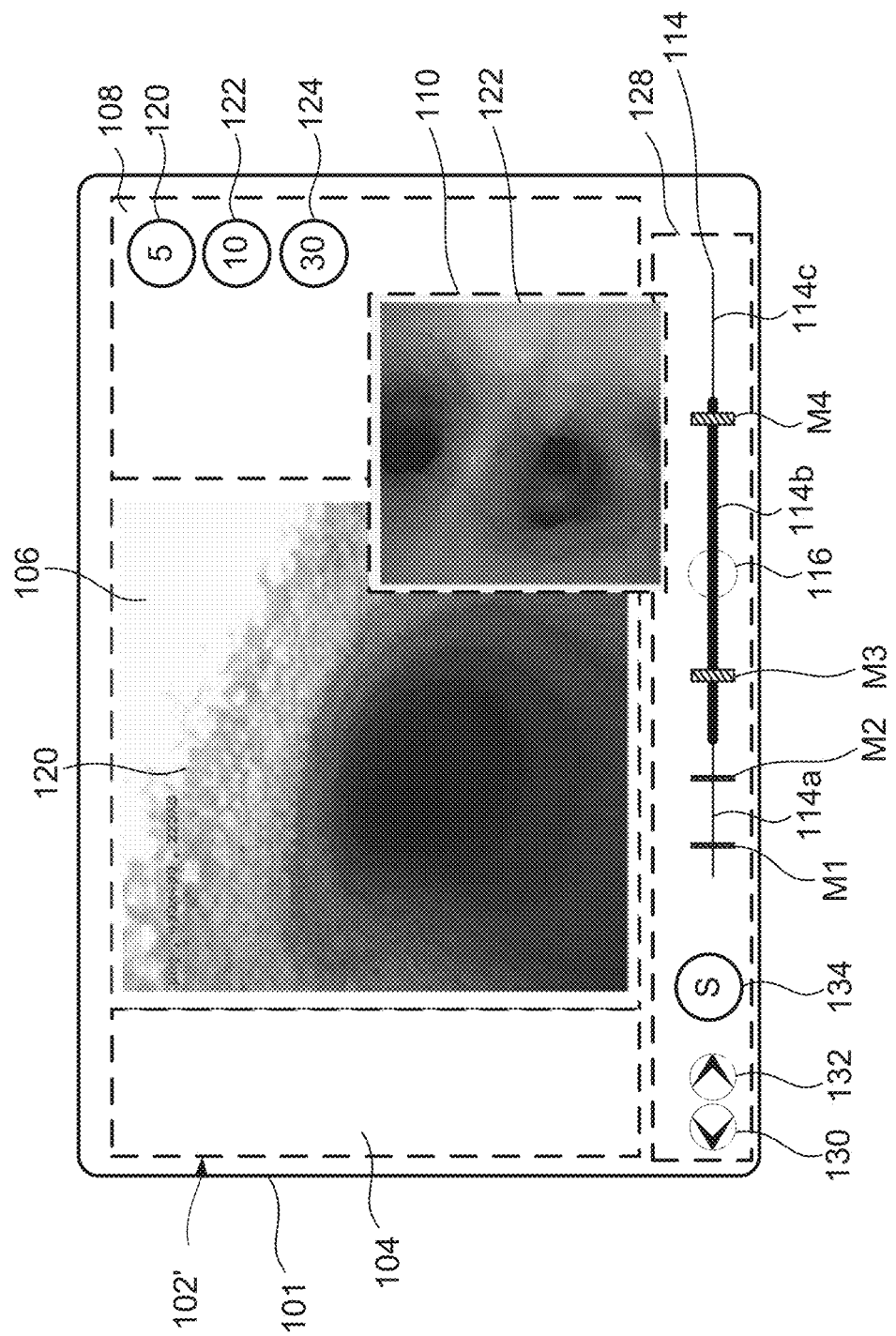
FIGS. 10 and 11 shows views of further variations of the embodiment of the graphical user interface of FIG. 1.
Figure 11:
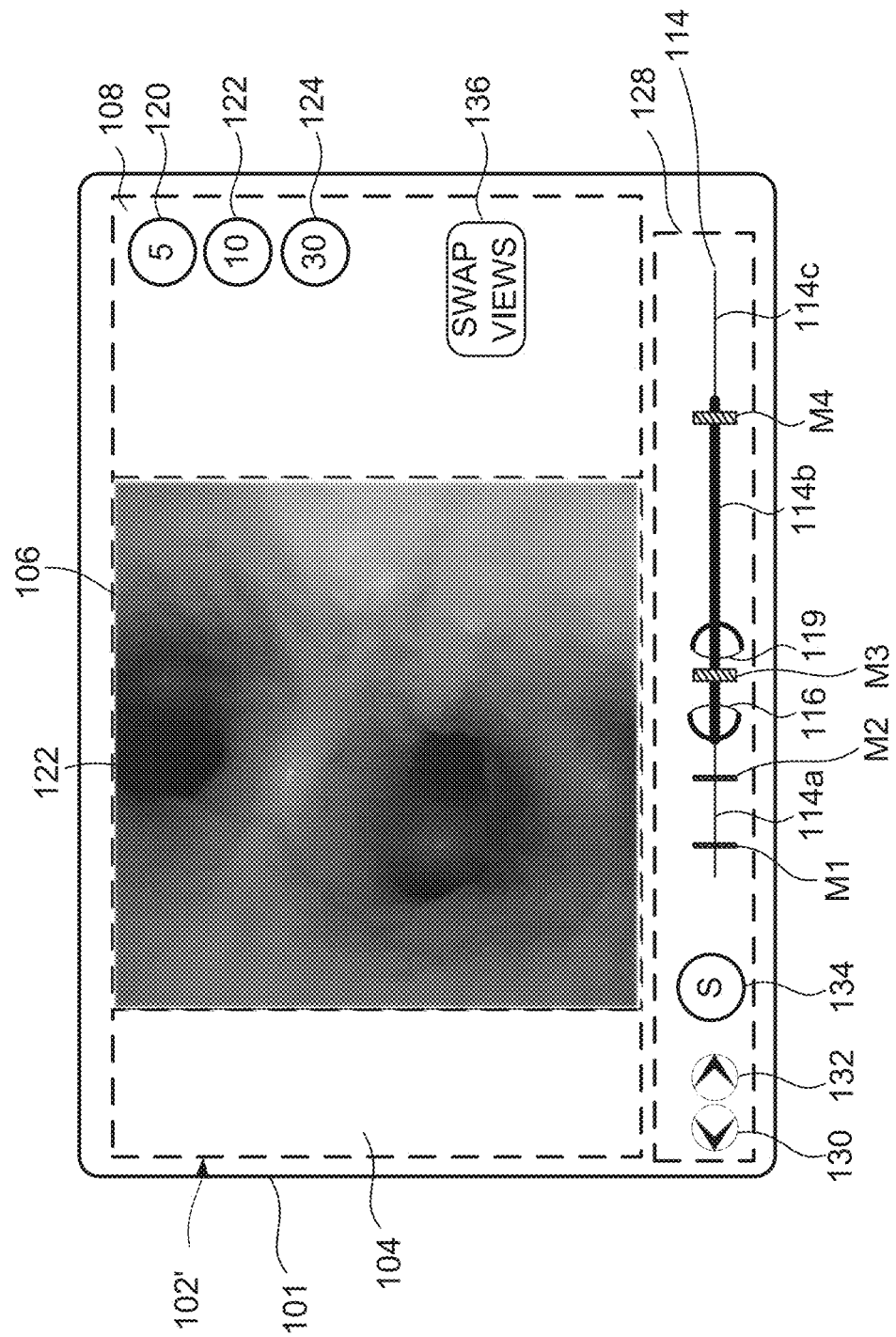

The features and variations of the GUI 102' can be combined to give the operator options. For example, FIG. 10 is the same as FIG. 9 except that the zoom feature was incorporated and a navigation panel 128 was added for ease of description. Additionally, during the estimated landmark validation process the pip panel 110 may be removed and the image 122 may be shown in the central panel 106 so that it is larger and easier to see and also so that the navigation panel 128 becomes less cluttered. For example, FIG. 11 shows a swap views button 136 that the operator can activate to enlarge the image 122 by presenting it in the central panel 106. FIG. 11 also shows the zoom feature and use of first and second frame selectors to extract retrospective clips around each marker.

Having described various embodiments and variations depicting features of the video processor 100 incorporated in the GUI logic 102 and the GUI 102', attention will now be turned to hardware aspects of the video processor 100. How to code a graphical user interface, whether in HTML language or other, is well known.

FIG. 12 depicts an embodiment of the video processor 100 with an integrated display. FIG. 13 depicts an embodiment of the video processor 100 without an integrated display. The video processor 100 includes a housing 202 enclosing and supporting the display 101 and a video processing circuit 206. A cable socket 204 receives a cable connector 304 of the endoscope 30 to establish a signal communication between the image sensor 322 and the video processing circuit 206. The image processing circuit 206 is described with reference to FIG. 14. Variations of the video processor 100 can be provided with various features of the video processor 100 but including or excluding other features. For example, it might not be desirable to provide a display with a touch screen, or it might be desirable to omit a display altogether. Omission of the display might be beneficial to take advantage of evolving display technologies which improve resolution and reduce cost. Provision of exchangeable medical device interfaces allows for adoption of evolving image sensor and visualization device technologies, thus use of existing or future-developed external displays could allow presentation of higher resolution or otherwise improved video. Use of external displays could also leverage existing capital investments.

Figure 14:
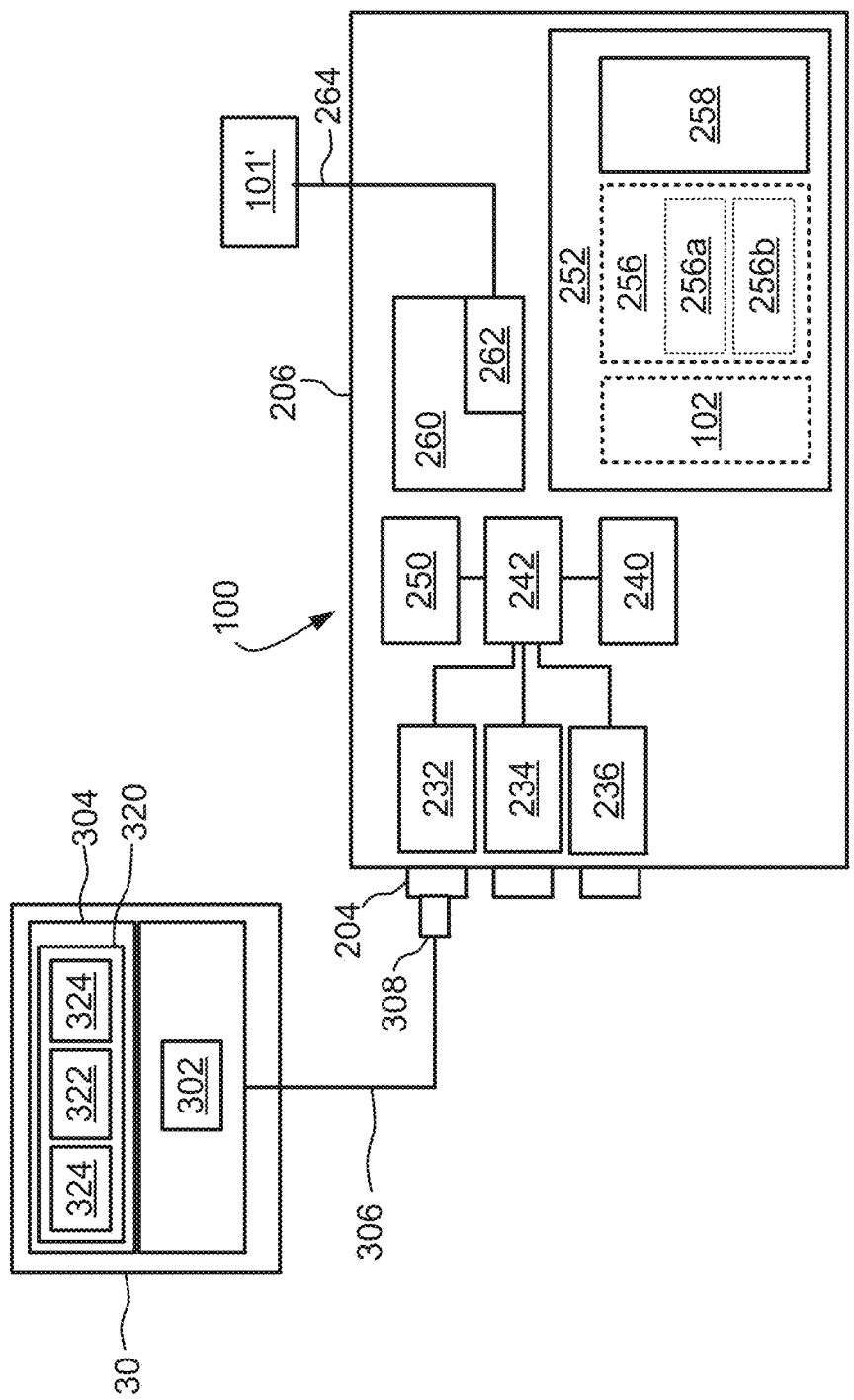
FIG. 14 is a schematic diagram of the video processors of FIGS. 12 and 13.

Referring to FIG. 14, the video processing circuit 206 of the video processor 100 is operable to receive image data or video, to present the GUI 102' to allow the operator to manipulate video with the touch display 101, and, optionally, output a video signal to allow remote viewing of the images presented with the display. A visualization device, such as the endoscope 30, is described in FIGS. 15 and 16. An embodiment of the endoscope 30 comprises a handle 302, an insertion cord 304, and a cable 306 extending from the handle to a connector plug 308. The insertion cord comprises a tip part 320 having an image sensor 322 and light emitters 324. The connector plug 308 is connected to a cable socket 204 and thereby is communicatively coupled with the video processing circuit 206. The cable socket 204 may be part of a medical device interface 232. A separate, potentially remote, display 101' is connected via a cable 264 to a video out connector 262 of a video output board 260, as is known in the art. The video out connector 262 may be an HDMI out connector.

The video processor 100 may include or omit the display screen 101 and may comprise one or more of the medical device interfaces 232, 234, 236. The video processor 100 may be referred to as an "image recording unit". The medical device interfaces 232, 234, 236 may include cable sockets and circuits to compatibilize the signals from the image sensors 322 to what the controller of the video processor expects to receive, in terms of image format, for example. Thus, a particular type of endoscope is matched with a corresponding medical device interface and the video processor 100 can thus enable use of different endoscope technologies. The medical device interfaces may also include isolation amplifiers to electrically isolate the video signal, and a power output connector to provide power to the endoscope for the image sensor and the LEDs. The medical device interfaces may also include a serial to parallel converter circuit to deserialize the video signals of endoscopes that generate serial signals, for example serial video signals. The medical device interfaces may also include a configuration connector (as part of the cable socket) to output image sensor configuration parameters such as image inversion, clock, shutter speed etc. The medical device interfaces may also include analog to digital converters to digitize analog signals generated by the image sensor. In other words, the medical device interfaces may be configured to receive analog or digital image signals. The medical device interfaces may also comprise wireless transceivers to receive the image signals from the visualization device wirelessly.

As used herein, the term "controller" means a device or devices capable of processing instructions and may be referred to as a processing unit. A controller may be referred to as a "processing unit". A controller typically converts coded instructions into timing and control signals that direct the operation of the other components of the device or system, such as memory, arithmetic logic unit, input and output devices, etc. Examples of controllers include complex programmable logic devices (CPLD), central processing units (CPU), graphic processing units (GPU), field programmable gate arrays (FPGAs), etc. A controller may be a single integrated circuit part or may comprise more than one integrated circuit part. For example, a controller may comprise a combination of a CPU and an FPGA, or a combination of a CPU, a GPU, and an FPGA. If the controller comprises more than one integrated circuit part, the integrated circuit parts are linked in a supervised or a distributed manner. For example, a primary integrated circuit part can instruct other integrated circuit parts to execute tasks programmed for the other integrated circuit parts. Alternatively, the other integrated circuit parts may execute their functions independently.

The video processing circuit 206 interconnects the medical device interfaces 232, 234, 236 with a controller 250, and a memory 252 having embedded thereon the graphical user interface (GUI) logic 102, object detection logic (OD logic) 256 and a database 258. The controller 250 may comprise a field-programmable gate array (FPGA) 242. Optionally, the video processing circuit 206 includes the video output board 260. The video processor 100 may also include a user interface 240 configured to connect a microphone. The user interface 240 may comprise a wireless interface operable to receive user inputs via a mouse, keyboard, or other physical user input devices. Example wireless interfaces include Bluetooth and Zigbee controllers. The user interface 240 may comprise a USB port to receive a USB connector of a wired user input device or a USB wireless interface operable to communicate wirelessly with the mouse, keyboard, and/or other physical user input devices including outputs from the touch display 101, 101'. Thus, the video processor 100 provides for flexibility in receiving user inputs via various user input devices as is known in the art. The video processing circuit 206 may comprise one or more rigid circuit board parts provided to mount some or all of the electronic parts, including the controller 250 (and the FPGA 242). The memory 252 may also be mounted thereon, for example.

The FPGA 242 is optionally provided because it is capable of rapid power-up (i.e. short boot-up time) and thus is useful in emergency situations. FPGAs process data very fast compared to other non-volatile memory/instruction combinations and are re-programmable. Therefore, FPGAs facilitate presentation of the live view of the images captured by the endoscope in real-time with minimal latency so that the physician observing the live view can take immediate actions even in emergency situations. The FPGA may process the raw image data generated by the visualization device by performing known optimization functions such as white balance, denoising and the like.

The controller 250 combines video received from the FPGA, if one is provided, and presents the live video with the GUI. As technology evolves, the functionality of the FPGA 242 may be performed without the FPGA 242. The video processor 100 is therefore not limited to the precise packaged integrated circuits described with reference to FIG. 14 but can be constructed to take advantage of design and cost targets and future video processing technologies. For example, faster/more costly memory may be used to increase graphics processing speed. Graphics processing may be provided in the FPGA or a processor that incorporates graphics processing logic such as a GPU may be used instead.

The term "logic" as used herein includes software and/or firmware executing on one or more programmable processing devices, application-specific integrated circuits, field-programmable gate arrays, digital signal processors, hard-wired logic, or combinations thereof. Therefore, in accordance with the embodiments, various logic may be implemented in any appropriate fashion and would remain in accordance with the embodiments herein disclosed. Logic may comprise processing instructions embedded in non-transitory machine-readable media (e.g. memory). The memory 252 may comprise multiple interconnected circuits, including a memory circuit embedded in the controller 250, a memory integrated circuit connected to the controller 250, a hard-drive connected to the controller 250, and any other devices operable to store data and communicate with the controller 250.

The GUI logic 102 comprises processing instructions to generate the GUI 102' presented with or by the video processor 100. The GUI can be responsive to user inputs received via the touch screen or other user inputs. The controller 250 receives video (image data), potentially preprocessed by the FPGA, and outputs video signals incorporating the GUI and image data. In one variation, the controller 250 received raw unprocessed or pre-processed image data, converts the image data by generating three (RGB) color channels, and outputs the RGB image data for presentation with a display. The GUI 102' may comprise a record button that can be toggled to record a clip of the live video. The controller 250 may then compress the clip of the live video (captured between presses of the record button by the operator) and save it to non-volatile memory. The non-volatile memory may comprise a solid-state drive (SSD). In theory, the video processor 100 may save to memory entire procedures captured every day for more than a year. This could potentially comprise 365×2 hours of video. Therefore video compression may necessary to balance video quality and the cost of the video processor. For example, when raw video captures 400×400 pixel frames, at 30 fps, which is then converted to 3 color channels, one second of uncompressed video can take 10-15 megabytes of memory, depending on the pixel bits/resolution. Thus, for the purpose of saving a lot of prospective videos, data compression when transferring video to non-volatile memory is economically desirable.

The video signals may be received by a memory buffer accessible to the controller 250 so that the controller 250 can generate the RGB frames, perform additional color and other enhancements, overlay the GUI panels etc. Techniques for presenting images are well known, including techniques using buffers or mapped memory. The GUI may present actionable items corresponding to actions selectable by the operator with any of the above-described user input devices to, for example, save retrospective clips. Example actionable items include the retrospective recording button 112, the prospective recording button 113, the frame selectors 116 and 119, the duration buttons 120, 122, 124, the left and right marker navigation buttons 130, 132, the save button 134, the swap views button 136, etc. The actionable items may be moved by the operator to generate, repeatedly, user inputs reflecting such movement, the user inputs being signals transmitted to the controller to convey the movement. The operator may move the actionable item by pressing a muse button and moving the mouse or touching the touch-display with, for example, a finger, and moving the finger while touching the touch-display. The actionable items may be released to generate user inputs reflecting such release, the user inputs being signals transmitted to the controller to convey the release. A release may comprise the operator ceasing to touch the touch-display or releasing the mouse button.

The actionable items displayed by the GUI may be activated by a user providing a touch input, e.g. a single tap, or a constant touch and release, at the respective location of the display (a touch for a touch-display and a mouse action if using a mouse). In some instances, an image data file corresponding to the image data received before the respective actionable item was activated may be stored in memory. A first activation of the actionable item may start collection of image data and a second activation of the actionable item may stop the collection of image data for the video. The stored video may correspond to the image data received between the first activation and the second activation of the actionable item or may correspond to activation of different actionable items, as described above. The actionable items may be displayed in a first appearance prior to the first activation and after the second activation and in a second appearance after the first activation and before the second activation. Activation results in generation of a signal transmitted to the controller, from the user interface, corresponding to the actionable item and, potentially, the sequence or timing of activations.

The video processor 100 also comprises the OD logic 256 and the database 258. The OD logic 256 comprises an object detection algorithm, or object detector 256a, that performs object recognition tasks.

As explained above, in one example the object detector 256a takes an image (or images) as input and then predicts bounding boxes, class probabilities, landmark matching, etc. for each object in the image. Generally, the object detector 256a comprises a first set of known processing instructions and libraries. In one variation, the object detection logic reads the image files, processes them, and outputs detected object data comprising bounding boxes data, labels, and confidence values representing a probability that a label correctly identifies an object from a training dataset. The label, therefore, is an anatomic landmark identifier. The identifiers correspond to locations in the visual organ model, thus correctly identifying an anatomic reference also determines its location in the visual organ model. The OD logic 256 can process a single image, a few images (less than 10, preferably 5 or less), or a multitude of images, to make the predictions. For example, the OD logic 256 may use a current image (t), an immediately preceding image (t−1), and the next preceding image (t−2) to make predictions. The output may be referred to as a set of anatomical landmarks or reference positions, each item in the set comprising bounding box data, labels, and confidence values. The OD logic 256 can comprise a supervised single-pass neural network or networks. By supervised it is meant that the neural network(s) is/are trained with images having a known output. For simplicity the disclosure refers to a single-pass neural network but it is understood that the object detector may comprise multiple networks and that is what is meant even though the singular form is used. The object detector assigns the class probabiliites to the bounding boxes, which include detected objects. The probabilities are based on a trained database of images. The object detector uses a convolutional neural network (CNN) to extract features from the image to predict the probability of learned classes. Optionally, a neural processor (NPU) or vision accelerators may be provided to improve robustness and reduce latency. Such NPU devices include, for example, Neural compute stick or NCS (Intel), Jetson AI edge devices (Nvidia), Apple neural engine (Apple), Coral Edge TPU (Google), and Neural processing engine (Qualcomm). Efficient object detection architectures use models based on MobileNEt, ShuffleNet, or GhostNet. Object detectors optimized for GPU computing commonly use ResNet, DarkNet, or DLA architectures.

To use a supervised single-pass object detector, the algorithm and necessary libraries are first downloaded and installed. This installs the neural network architecture. The object detector is then programmed with the location where to read the image files and the location where to store the output. The object detector detects and identifies objects and provides a confidence value indicative of the likelihood that the object was identified correctly. For example, in an image of an office, the object detector may detect a computer with 75% confidence, a desk with 90%, etc. The object detector may accept a confidence threshold value and exclude objects that do not reach the confidence threshold value.

The object detector separates the image into N grids. Each of these grids is of equal size S×S. For each grid, bounding box coordinates, B, for the potential object(s) are predicted with an object label and a probability score for the predicted object's presence. The OD logic may comprise proximity suppression logic operable to produce a subset of anatomic landmarks from a set of anatomic landmarks detected by the neural network model based on a prior landmark. The proximity suppression logic comprises a non-maximal suppression function that suppresses all the bounding boxes with comparatively lower probability scores. First, the probability scores associated with each decision are determined and the largest score identified. Then, the bounding boxes with the largest Intersection over Union with the chosen high probability bounding box are removed. This step is then repeated until only the desired final bounding boxes remain. Advantageously, use of the proximity suppression logic increases the confidences of the predicted landmarks relative to the confidences obtained without the proximity suppression logic with minimal computational costs. Proximity suppression logic is described in commonly-owned U.S. Patent Publication No. 2023-0172428.

Before training a neural network model, a labeling tool is used to label the images. The desired classifications should be accurately labeled. A user can review and modify the bounding boxes and assign correct labels. Images are used for a training set, for a test set, and optionally for a validation set. The training set is used for training a neural network model and the other sets are used to assess whether the training is adequate. About 2,000 images per classification are desirable for accuracy of prediction. Once the training of the neural network model is completed, the neural network model can be used to perform object detection.

Different neural network models can be used for different endoscopic procedures, such as colonoscopy. The training sets are selected based on the procedure. Thus, the video processor 100 can enable the user to choose a procedure and based on the choice use OD logic corresponding to the choice. Each medical device interface is configured for a particular type of endoscope. Thus, alternatively or additionally, the medical device interface can indicate the procedure and the video processor 100 can automatically choose the visual organ model and the OD logic when an endoscope is connected to the medical device interface.

It has been found that when the endoscope travels into a right or left lumen after reaching a bifurcation, the structures in the right and left sides look very similar. It is therefore difficult based on the images alone to make an accurate prediction. To enhance the prediction, the proximity suppression logic 256b is provided which uses an estimated prior location of the endoscope to reduce the number of predictions. The reduced number of predictions have, therefore, higher confidences and may be referred to as a subset of anatomical reference positions. The OD logic 256 may comprise the object detector 256a and the proximity suppression logic 256b.

The proximity suppression logic, or PS logic 256b, comprises a proximity suppression map. The proximity suppression map is provided to increase the confidence values by removing from the object detection analysis potential objects that, based on the location of the endoscope, cannot be the object in the image. Generally, an endoscopic procedure comprises moving the endoscope into and through the patient, typically through various lumens. The path from the entry point to the distal-most point of the navigation route can be divided into segments. If the endoscope is at an anatomic reference position that is near the entry point, the image objects cannot correspond to anatomic reference positions at the distal-most point of the route. Confidence windows are used around the prior position of the endoscope, and anatomic reference positions are given a weights, based on the windows, intended to reduce the confidence value so that they will not be identified by the object detection analysis, thus increasing the confidence values of the anatomic reference positions closer to the prior position.

The map comprises a multitude of anatomic reference position groups, each group including a prior anatomic reference position and weights for the other anatomic reference positions based on their proximity to the prior anatomic reference position. The further away an anatomic reference position is from the prior position, the more likely it is that it will produce an incorrect prediction. Therefore, a far position has a weight that when multiplied by the confidence of the respective prediction reduces its confidence. For example, a 0.1 weight will reduce a 90% confidence to 9%. Each neural network model, e.g. model for bronchioscopy, model for colonoscopy, etc., uses a corresponding proximity suppression map that describes the segments of the procedure's model and defines the proximity derived weights. The weights are determined empirically, preferably with a trained neural network model, by adjusting weights until the subset of predictions has a desired size. Once defined, the proximity suppression map is stored in the memory. As explained below, once a prior position of the endoscope is determined, the logic uses the prior position to find a relevant group and then applies the weights in the group. As the endoscope moves, different weights are applied to each position upstream and downstream of the current position in the route.

The database 258 may be used to store anatomic landmark positions of a route. The database 258 may also be used to track the movement of the endoscope and determine whether all the positions in the route have been examined. The database 258 may comprise tables including the landmarks along a route and a field indicative of whether the landmark was examined. When the operator saves an estimated landmark as an actual landmark, e.g. M1-M4 in FIG. 10, the OD logic may update the table to indicate that those landmarks were examined. Thereafter the PS logic 256b can provide a better estimate of the next landmark position.

As described above, the video processor 100 is operationally connectable to the image sensor 322 and the display 101' and/or connected to the display 101. The controller 250 is configured to continuously update the image buffer 252v of the memory 252 with the images captured by the image sensor of the endoscope. The image buffer 252v stores a stream of images received within a first period back in time e.g. the last 30 seconds. It is also possible that the image buffer 252v stores the entire stream of images received within a current endoscopic procedure, where the image buffer 252v first is reset before another endoscopic procedure is performed. The controller 250 is further configured to, in response to a received user input, store a stream of images, or retrospective video or clip 142, captured by the image sensor in the memory 252nv. The user input may be received by the user interface 240 and may correspond to the operator touching the touch-display 101, 101'. It is also possible that the user input may be received from another unit e.g. a hardware button on the handle of the endoscope. The stream of images 142 comprises a subset of the stream of images stored in the image buffer 252v at the time when the user input was received, where the subset is selected dependent on the user input so that a user may select the point back in time where the user wants the stream of images 142 to start. Consequently, by allowing the user to start recording video from a point back in time, the risk that the user misses an important clinical moment may be reduced. Furthermore, by allowing the user to select a particular point back in time, only the clinical important moment may be captured and not a long period of time before the clinical important moment occurred. This may reduce the memory size of the permanently stored stream of images and further make it easier to find the clinical important moment in the permanently stored stream of images.

The aforementioned description of the operation of the video processor 100 will now be described as a method of recording images according to an embodiment of the disclosure. The method starts with continuously receiving images captured by the image sensor of the endoscope. Next, an image buffer is continuously updated with the received images, the received images in the image buffer including a stream of images received within a first period back in time. Finally, in response to a received user input, a stream of images recorded by the image sensor is stored permanently in memory, wherein the permanently stored stream of images includes a subset of the stream of images stored in the temporary image buffer at the time when the user input was received, and wherein the subset is selected dependent on the user input so that a user may select the point back in time where the user wants the permanently stored stream of images to start.

Returning to the description of the video processor 100, in a further embodiment the controller 250 is configured to control the display 101 to present live images recorded by the image sensor of the endoscope in a first panel of the display 101. The remaining part of the display 101 may be used to show other relevant information such as patient information or parameter values of the display or the endoscope. The processor may be configured to control the display to show a symbol, e.g. the prospective recording button, indicating that a recording is being performed. In this embodiment, a second panel partly overlaps the first panel. The controller is configured to select a subset of the stream of images stored in the image buffer 252v based on a second user input as explained in the following. The controller is configured to replay the stream of images stored in the image buffer in the second panel. The controller, in response to the first user input, is further configured to control the display to present a scrubber bar or timing bar/frame selector. A third user input is received after the first user input but before the second user input. The third user input is a selection and movement along the scrubber bar. The stream of images stored in the image buffer are replayed (in reverse, back in time) in response to the selection and movement of the scrubber bar. The second user input is a release of the frame selector. The selection of the subset of the stream of images stored in the image buffer is based on the image of the image buffer shown in the second panel at the time when the second user input is received, i.e. when the scrubber bar/frame selector is released. The length of the first stream of images continues to grow as the user has not stopped the recording. After the user has stopped the recording e.g. via a fourth user input, a stream of images is permanently stored comprising the subset and the first stream of images. The first stream of images may be compressed while the subset is uncompressed or less compressed than the first stream of images.

The step of updating the image buffer may comprise storing a new image/frame. Additionally, the step of updating the image buffer may comprise deleting the oldest image/frame stored.

The image buffer may be automatically deleted after an endoscopic procedure has been finished.

The length of the first period back in time may be a factory parameter setting that the operator cannot change. Alternatively, it may be a parameter setting that the operator may select, typically before an endoscopic procedure is initiated e.g. as part of a setup procedure. The length of the first period back in time may be limited to only capture a part of a typical endoscopic procedure. Alternatively, the length of the first period back in time may be set so that it captures substantial all of a typical endoscopic procedure.

The user input may be received directly via the video processor e.g. the user input may be received via one or more buttons on the video processor or the GUI. Alternatively, it may be received via another unit communicatively coupled to the video processor, e.g. an endoscope handle may comprise on or more buttons that may be used by the operator to provide the user input.

The stream of images permanently stored are not automatically deleted during or after a medical procedure. However, the operator may have the option to manually delete the stream of images permanently stored.

The stream of images permanently stored, e.g. the retrospective video or clip, may be stored at a frames-per-second (FPS) corresponding the FPS of the images in the image buffer, which may be the FPS of the image sensor. The images shown in the pip, or second, panel may be shown at a lesser FPS. In particular, every second or second and third or second, third and fourth, frame may be skipped as the operator moves to see images back in time, and even more particularly more frames may be skipped in correspondence with the variable frame selector movement. The faster the operator wants to move back in time (left), the more frames can be skipped from being shown in the second panel, thereby saving processing capacity.

In some embodiments, the length of the first period is at least 8 seconds, at least 10 seconds, at least 30 seconds, or at least 1 minute, and preferably maximum 30 minutes. Consequently, by having an image buffer of a considerable length the operator may be allowed to go back in time a significant amount. Furthermore, memory may be saved by only storing retrospective videos or retrospective videos and compressed prospective videos.

In some embodiments the operator may select between at least three points back in time. Consequently, the operator may be provided with the flexibility to start a video at a desired point in time. This may secure that the video does not contain unnecessary content which only will result in an increase of memory usage and further make it more difficult afterwards to find the clinical important information.

The operator may be provided with the opportunity to select any particular frame of the image buffer. Alternative, the operator may be able to select between a number of predetermined points in time, e.g. 2 seconds, 5 seconds, 10 seconds or 30 seconds.

In some embodiments the user input comprises a first user input and a second user input, the second user input being received after the first user input, wherein the controller in response to the first user input is configured to start storing the images received from the image sensor forming a first stream of images, and wherein the controller in response to the second user input is configured to select the subset of the stream of images stored in the image buffer, and wherein the stream of images permanently stored comprises the subset and the first stream of images. Consequently, the operator may have the opportunity to use more time to select the particular point back in time, e.g. after the recording has been initiated. This may be especially important if the image buffer has a limited size.

The first user input and the second user input may be received from the same input unit e.g. the first user input and the second user input may be received from an input unit of the video controller or the handle of the endoscope. Alternatively, the first user input may be received from a first input unit and the second user input may be received from a second input unit e.g. the first user input may be received from an input unit of the endoscope handle and the second user input may be received from an input unit of the video processor.

The controller may also be configured to stop updating the image buffer in response to the first user input. This may be especially beneficial if the step of updating the image buffer comprises deleting the oldest image stored as it may provide the operator with more time to provide the second user input.

In some embodiments the controller is configured to, in response to the first user input, control the display to present live images captured by the image sensor of the endoscope in the first panel of the display, and further images of the image buffer in the second panel of the display. Consequently the operator may both still be able to follow what goes on live in the body of the patient and be provided with visual feedback for selecting the point back in time.

In some embodiments the controller is configured to, after having received the first user input, replay the stream of images stored in the image buffer in the second display zone, preferably in a reverse direction, and wherein the controller further is configured to in response to the second user input select the subset of the stream of images stored in the image buffer based on the image of the image buffer shown in the second display zone at the time when the second user input is received.

In some embodiments the user input further comprises a third user input, the third user input being received after the first user input but before the second user input, the display is a touch display, and wherein the controller in response to the first user input is further configured to control the display to display a scrubber bar, and wherein the third user input is a selection and/or movement along the scrubber bar, the replay of the stream of images stored in the image buffer is done in response to the selection and/or movement of the scrubber bar, and wherein the second user input is a release of the scrubber bar. Consequently, a simple an intuitive way of allowing the user to select the point back in time is provided.

In some embodiments the endoscope comprises one or more input elements, the video controller is operationally connectable to one or more input elements, and wherein the first user input and/or the second user input are received via the one or more input element of the endoscope. Consequently, more parts of the system may be controlled via the endoscope which may enable the doctor to work more effectively.

Figure 15:
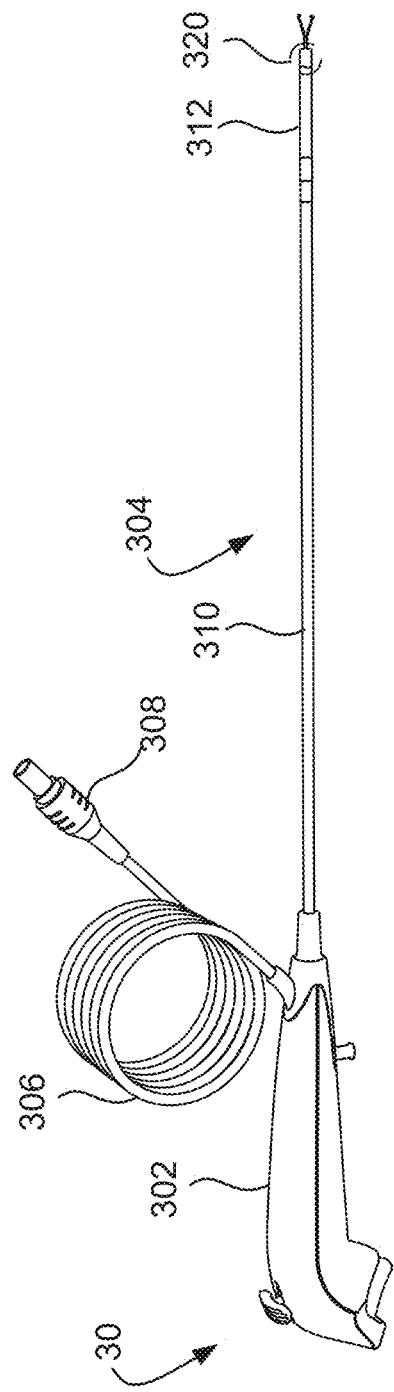
FIG. 15 is a perspective view of an endoscope.
Figure 16:
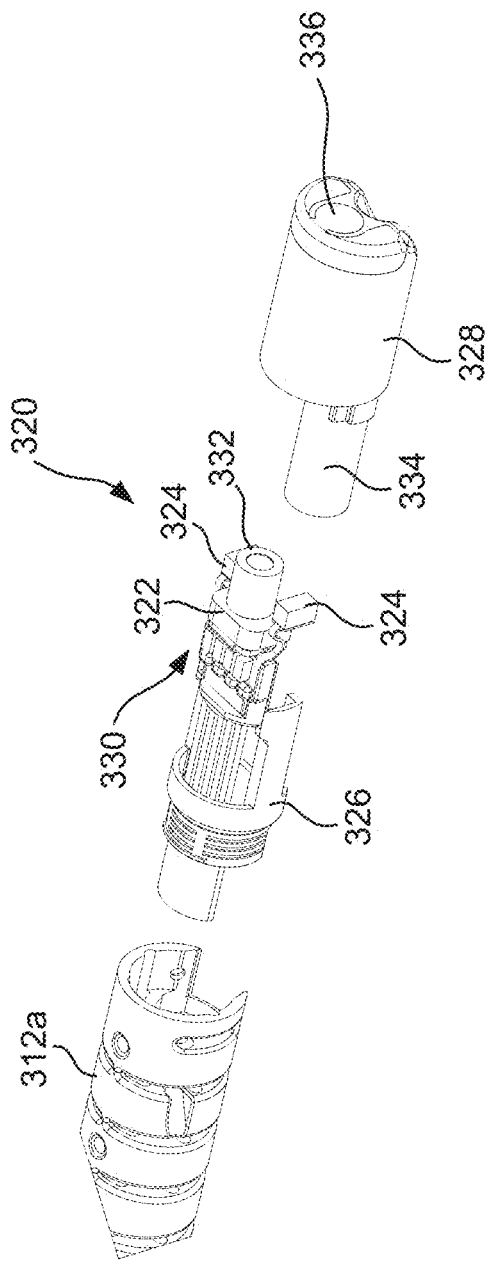
FIG. 16 is an exploded perspective view of a distal end of the endoscope of FIG. 15.

FIGS. 15 and 16 illustrate an example of the endoscope 30 comprising the handle 302, the insertion cord 304, and the cable 306 extending from the handle to a connector plug 308. The insertion cord 304 comprises an insertion tube 310, a bending section 312 and the tip part 320 having an image sensor 322 and light emitters 324. The image sensor 322 may be referred to as an "image capturing device". The bending section 312 comprises a bending section body 312a including a proximal end segment connected to the insertion tube 310, a distal end segment connected to the tip part 320, and intermediate segments therebetween. All the segments are interconnected by hinges molded in one piece with the segments. Therefore, assembly of the segments is not required. A sleeve (not shown) is placed over the bending section body 312a. The tip part 320 comprises a closer portion 326 comprising a proximal portion that is bonded to the distal end segment, and a proximal portion bonded to a housing 328. A camera assembly 330 comprises the image sensor 322 and a lens barrel 332 including lenses. The proximal portion supports the camera assembly and can be push the camera assembly 330 into a spacing of the housing 328. A portion of a working channel, 334, is also shown. The image sensor 322 captures images of a view received through a window 336 of the housing 328.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

The terms "first", "second", "third" and "fourth" in the context of an embodiment or variation or claim are arbitrary labels used to distinguish four elements or actions or functions. However, in a different embodiment or variation or claim, the terms "first", "second", "third" and "fourth" may be used as arbitrary labels to distinguish four elements or actions or functions that may be the same or may be different from those distinguished previously or thereafter.

The term "comprising," "including," and "having," and variations thereof, are open transition terms that specify the presence of stated features, integers, steps or components but do not preclude the presence or addition of one or more other features, integers, steps, components or groups thereof. By contrast, the term "consisting" is a closed transition term that precludes the presence or addition of one or more other features, integers, steps, components or groups thereof.

We claim:

1. A video processor configured to record images captured by an image sensor of a visualization device, the video processor comprising:
a processing circuit including volatile memory, non-volatile memory, and a controller, at least a portion of the volatile memory designated as an image buffer;
a housing at least partly enclosing the processing circuit; and
a communication interface configured to receive from the visualization device image signals corresponding to the images captured by the image sensor,
wherein the controller is configured to:
cause the display to present a graphical user interface (GUI), live views of the images, a frame selector of the GUI, and frames stored in the image buffer and comprised of image data corresponding to the image signals,
update the image buffer with the frames as the image signals are received at the connection port,
repeatedly receive a first user input responsive to movement the frame selector,
cause the display to present at least some of the frames in response to receipt of the first user inputs,
receive a second user input responsive to release of the frame selector,
identify as a first retrospective frame a frame, of the at least some of the frames, presented at the time the controller received the second user input,
identify a second retrospective frame, and
store a retrospective video file in the non-volatile memory, the retrospective video file beginning and ending with the first retrospective frame and the second retrospective frame and including frames, of the frames, between the first retrospective frame and the second retrospective frame.

2. The video processor of claim 1, wherein the GUI comprises a second frame selector, and wherein the controller is configured to:
repeatedly receive a third user input responsive to movement of the second frame selector,
cause the display to present at least some of the frames in response to receipt of the third user inputs,
receive a fourth user input responsive to release of the second frame selector, and
identify as the second retrospective frame a frame, of the at least some of the frames, presented at the time the controller received the fourth user input.

3. The video processor of claim 2, wherein the first retrospective frame is the first or the last frame of the retrospective video file and the second retrospective frame is, correspondingly, the last or the first frame of the retrospective video file.

4. The video processor of claim 3, wherein the last frame of the retrospective video file was stored in the image buffer after the controller received the first user input.

5. The video processor of claim 1, wherein the controller is configured to:
update the image buffer with the frames at a first frame-rate; and
cause the display to present the at least some of the frames, in response to receipt of the first user inputs, at a variable frame-rate dependent on a movement velocity of the frame selector and/or a position of the frame selector.

6. The video processor of claim 1, wherein the controller is configured to:
cause the display to present at least some of the frames and the live views of the images concurrently.

7. The video processor of claim 1, wherein the controller is configured to:
cause the display to, in response to receipt of the first user inputs, not present a number of frames located after each of the at least some presented frames, the number comprising an integer between 1 and 5.

8. The video processor of claim 7, wherein the number is a variable number dependent on a movement velocity of the frame selector and/or a position of the frame selector.

9. The video processor of claim 1, wherein the first retrospective frame is the first frame of the retrospective video file, and wherein the controller is configured to identify as the second retrospective frame a frame, of the frames, presented at the time the controller received the first user input, the second retrospective frame being the last frame of the retrospective video file.

10. The video processor of claim 1, wherein the controller is configured to store the retrospective video file in the non-volatile memory uncompressed or compressed in a lossless format, and wherein the controller is configured to store a lossy compressed prospective video file in the non-volatile memory, the lossy compressed prospective video file comprising the frames in the updated image buffer.

11. The video processor of claim 1, wherein the controller is configured to:
update the image buffer with the frames at a first frame-rate; and
cause the display to present at least some of the frames, in response to receipt of the first user inputs, at a second frame-rate smaller than the first frame-rate.

12. The video processor of claim 1, wherein the controller is configured to:
cause the display to present with the GUI a timing bar,
identify landmark frames in the frames stored in the updated image buffer, the landmark frames being frames estimated by the controller to depict known landmarks, and
cause the display to present with the GUI estimated landmark markers on the timing bar, positions of the estimated landmark markers corresponding to positions of the landmark frames in the updated image buffer.

13. The video processor of claim 12, wherein the video processor includes a trained database and object recognition logic comprising a supervised single-pass neural network or networks configured to extract features from the frames and compare the features to features in images of the trained database to estimate the landmark frames.

14. The video processor of claim 12, wherein the controller is configured to:
cause the display to present with the GUI a save or validation button; and
upon receiving a signal responsive to activation of the save or validation button, select a frame corresponding to a position of the frame selector as an actual landmark frame.

15. The video processor of claim 14, wherein the controller is configured to:
cause the display to present with the GUI a left marker navigation button and a right marker navigation button; and
upon receiving a signal responsive to activation of the left marker navigation button or the right marker navigation button, move the frame selector to a position adjacent or coincident with a position of the nearest, respectively, estimated landmark markers on a left or a right side of a current position of the frame selector.

16. The video processor of claim 1, wherein the display comprises a touch-display supported by and at least partly enclosed by the housing.

17. The video processor of claim 16, wherein release of the frame selector is caused by the operator not touching the frame selector or a mouse button being released by the operator.

18. The video processor of claim 1, wherein the communication interface comprises a receptacle configured to receive a visualization device connector or comprises a wireless transceiver configured to receive the image signals from a transceiver of the visualization device.

19. A documentation system comprising the video processor of claim 1 and the visualization device.

20. A video processor configured to record images captured by an image sensor of a visualization device, the video processor comprising:
 a processing circuit including volatile memory, non-volatile memory, and a controller, at least a portion of the volatile memory designated as an image buffer;
 a housing at least partly enclosing the processing circuit; and
 a communication interface configured to receive from the visualization device image signals corresponding to the images captured by the image sensor,
 wherein the controller is configured to:
  cause the display to present a graphical user interface (GUI), a frame selector of the GUI, and frames stored in the image buffer and comprised of image data corresponding to the image signals,
  update the image buffer with the frames as the image signals are received at the connection port,
  cause the display to present with the GUI a timing bar,
  identify landmark frames in the frames stored in the updated image buffer, the landmark frames being frames estimated by the controller to depict known landmarks,
  cause the display to present with the GUI estimated landmark markers on the timing bar, positions of the estimated landmark markers corresponding to positions of the landmark frames in the updated image buffer, and
  save retrospective video files in the non-volatile memory, at least some of the retrospective video files including an actual landmark frame.

21. The video processor of claim 20, wherein the controller is configured to save the retrospective video files responsive to a single user input.

22. The video processor of claim 20, wherein the video processor includes a trained database and object recognition logic comprising a supervised single-pass neural network or networks configured to extract features from the frames and compare the features to features in images of the trained database to estimate the landmark frames.

23. The video processor of claim 20, wherein the controller is configured to:
 cause the display to present with the GUI a save or validation button; and
 upon receiving a signal responsive to activation of the save or validation button, select a frame corresponding to a position of the frame selector as an actual landmark frame.

24. The video processor of claim 23, wherein the controller is configured to save the retrospective video files responsive to a single user input.

25. The video processor of claim 23, wherein the controller is configured to:
 cause the display to present with the GUI a left marker navigation button and a right marker navigation button; and
 upon receiving a signal responsive to activation of the left marker navigation button or the right marker navigation button, move the frame selector to a position adjacent or coincident with a position of the nearest, respectively, estimated landmark markers on a left or a right side of a current position of the frame selector.

26. The video processor of claim 20, wherein the controller is configured to:
 repeatedly receive a first user input responsive to movement the frame selector,
 cause the display to present at least some of the frames in response to receipt of the first user inputs,
 receive a second user input responsive to release of the frame selector,
 identify as a first retrospective frame a frame, of the at least some of the frames, presented at the time the controller received the second user input,
 identify a second retrospective frame, and
 store a retrospective video file in the non-volatile memory, the retrospective video file beginning and ending with the first retrospective frame and the second retrospective frame and including frames, of the frames, between the first retrospective frame and the second retrospective frame.

27. A documentation system comprising the video processor of claim 20 and the visualization device.

* * * * *